(12) United States Patent
Cheong et al.

(10) Patent No.: US 9,237,350 B2
(45) Date of Patent: Jan. 12, 2016

(54) IMAGE PROCESSING SYSTEM WITH RANDOM ACCESS CAPABLE INTEGRAL IMAGE COMPRESSION AND METHOD OF OPERATION THEREOF

(71) Applicant: Sony Corporation, Tokyo (JP)

(72) Inventors: Hye-Yeon Cheong, Los Gatos, CA (US); Ali Tabatabai, Cupertino, CA (US)

(73) Assignee: Sony Corporation, Tokyo (JP)

( * ) Notice: Subject to any disclaimer, the term of this patent is extended or adjusted under 35 U.S.C. 154(b) by 33 days.

(21) Appl. No.: 14/305,199

(22) Filed: Jun. 16, 2014

(65) Prior Publication Data

US 2015/0365674 A1 Dec. 17, 2015

(51) Int. Cl.
*G06K 9/36* (2006.01)
*G06K 9/46* (2006.01)
*H04N 19/126* (2014.01)
*H04N 19/157* (2014.01)
*H04N 19/176* (2014.01)
*H04N 19/50* (2014.01)

(52) U.S. Cl.
CPC ........... *H04N 19/126* (2014.11); *H04N 19/157* (2014.11); *H04N 19/176* (2014.11); *H04N 19/50* (2014.11)

(58) Field of Classification Search
None
See application file for complete search history.

(56) References Cited

U.S. PATENT DOCUMENTS

| | | | |
|---|---|---|---|
| 4,675,750 A | 6/1987 | Collins et al. | |
| 5,631,849 A | 5/1997 | Wallace | |
| 5,839,100 A | 11/1998 | Wegener | |
| 6,018,303 A | 1/2000 | Sadeh | |
| 6,141,446 A | 10/2000 | Boliek et al. | |
| 7,613,357 B2 | 11/2009 | Owechko et al. | |
| 8,059,903 B2 | 11/2011 | Yamatani et al. | |
| 8,107,754 B2 | 1/2012 | Chen et al. | |
| 8,176,368 B2 | 5/2012 | Wand et al. | |
| 2008/0316327 A1* | 12/2008 | Steinberg | G06K 9/00248 348/222.1 |
| 2011/0243219 A1* | 10/2011 | Hong | H04N 19/176 375/240.02 |
| 2011/0292247 A1 | 12/2011 | Gharavi-Alkhansari et al. | |

* cited by examiner

*Primary Examiner* — Phuoc Tran
(74) *Attorney, Agent, or Firm* — Ishimaru & Associates LLP

(57) ABSTRACT

A system and method of operation of an image processing system includes: an imaging device for receiving a source image; a mode module for receiving a random access block of an integral image formed by summing a portion of the source image, and for calculating a chosen mode and a quantization number from the random access block; a quantization module for forming a quantized block by shifting the random access block based on the chosen mode; a predictor module for calculating a predictor block based on the quantized block; and a fixed length coding module for calculating a residual block by subtracting the predictor block from the quantized block, for calculating a fixed length coding residual based on the chosen mode and the residual block, and for forming an image bitstream having the quantization number and the fixed length coding residual.

20 Claims, 21 Drawing Sheets

DPCM 2 MODE (qn = 0,1,2,3)

DPCM 1 MODE (qn = 4)

| Average PSNR in 32-bit Integral domain | | 8 bps | 11 bps | 12 bps | 13 bps | 14 bps | 15 bps | 16 bps | 17 bps |
|---|---|---|---|---|---|---|---|---|---|
| CrowdRun IIS | Original EBC | 129.93 | 147.99 | 154.02 | 160.05 | 166.05 | 172.08 | 178.07 | 184.02 |
| | Proposed | 160.15 | 178.86 | 184.80 | 190.57 | 195.79 | 205.87 | 216.71 | Inf |
| | Proposed-Original | +30.22 | +30.87 | +30.78 | +30.52 | +29.74 | +33.79 | +38.64 | +Inf |
| PeopleOnStreet IIS | Original EBC | 127.69 | 145.73 | 151.79 | 157.77 | 163.78 | 169.80 | 175.82 | 181.81 |
| | Proposed | 161.77 | 180.47 | 186.39 | 192.12 | 197.30 | 210.68 | Inf | Inf |
| | Proposed-Original | +34.08 | +34.74 | +34.60 | +34.35 | +33.52 | +40.88 | +Inf | +Inf |

FIG. 14

| Average PSNR in 8-bit pixel domain | | 8 bps | 11 bps | 12 bps | 13 bps | 14 bps | 15 bps | 16 bps | 17 bps |
|---|---|---|---|---|---|---|---|---|---|
| CrowdRun IIS | Original EBC | 6.55 | 7.07 | 8.08 | 11.07 | 16.12 | 21.80 | 27.64 | 33.66 |
| | Proposed | 10.98 | 28.41 | 34.44 | 40.69 | 47.43 | 58.09 | 69.09 | Inf |
| | Proposed-Original | +4.43 | +21.34 | +26.36 | +29.62 | +31.31 | +36.29 | +41.45 | +Inf |
| PeopleOnStreet IIS | Original EBC | 5.48 | 6.22 | 7.14 | 9.49 | 14.16 | 19.63 | 25.46 | 31.42 |
| | Proposed | 12.16 | 30.04 | 36.07 | 42.40 | 49.44 | 63.14 | Inf | Inf |
| | Proposed-Original | +6.68 | +23.82 | +28.93 | +32.91 | +35.28 | +43.51 | +Inf | +Inf |

FIG. 15

| Average PSNR in 32-bit Integral domain | | 8 bps | 11 bps | 12 bps | 13 bps | 14 bps | 15 bps | 16 bps | 17 bps |
|---|---|---|---|---|---|---|---|---|---|
| CrowdRun IID | Original EBC | 134.24 | 152.30 | 158.30 | 164.34 | 170.34 | 176.36 | 182.34 | 188.28 |
| | Proposed | 162.64 | 180.92 | 186.83 | 192.95 | 198.20 | 230.54 | Inf | Inf |
| | Proposed-Original | +28.4 | +28.62 | +28.53 | +28.61 | +27.86 | +54.18 | +Inf | +Inf |
| PeopleOnStreet IID | Original EBC | 132.02 | 150.07 | 156.08 | 162.12 | 168.14 | 174.14 | 180.16 | 186.10 |
| | Proposed | 164.66 | 183.10 | 188.98 | 195.34 | 200.92 | 244.52 | Inf | Inf |
| | Proposed-Original | +32.64 | +33.03 | +32.9 | +33.22 | +32.78 | +70.38 | +Inf | +Inf |

FIG. 16

| Average PSNR in 8-bit pixel domain | | 8 bps | 11 bps | 12 bps | 13 bps | 14 bps | 15 bps | 16 bps | 17 bps |
|---|---|---|---|---|---|---|---|---|---|
| CrowdRun IID | Original EBC | 6.57 | 8.72 | 10.21 | 12.23 | 14.40 | 16.55 | 18.99 | 21.85 |
| | Proposed | 10.34 | 16.88 | 19.69 | 23.84 | 27.86 | 57.58 | Inf | Inf |
| | Proposed-Original | +3.77 | +8.16 | +9.48 | +11.61 | +13.46 | +41.03 | +Inf | +Inf |
| PeopleOnStreet IID | Original EBC | 6.01 | 8.05 | 9.45 | 11.30 | 13.53 | 15.70 | 18.05 | 20.60 |
| | Proposed | 11.51 | 17.84 | 20.78 | 24.23 | 28.82 | 70.38 | Inf | Inf |
| | Proposed-Original | +5.5 | +9.79 | +11.33 | +12.93 | +15.29 | +54.68 | +Inf | +Inf |

FIG. 17

| II Type | Header (qn) | Pixel-level Coding Method | | | FLC length (including sign bit) | | | Sign bit | | | Refinement Bits Num |
|---|---|---|---|---|---|---|---|---|---|---|---|
| | | Mode | Y0 | Y1 | Y2-Y7 | Y0 | Y1 | Y2-Y7 | Y0 | Y1 | Y2-Y7 | |
| STRAIGHT | 00 | DPCM2 | PCM | 1st order DPCM | 2nd order DPCM | 27 | 17 | 13 | 0 | 0 | 1 | 0 |
| | 01 | DPCM2 | PCM | 1st order DPCM | 2nd order DPCM | 26 | 16 | 14 | 0 | 0 | 1 | 0 |
| | 10 | DPCM2 | PCM | 1st order DPCM | 2nd order DPCM | 25 | 15 | 14 | 0 | 0 | 1 | 2 |
| | 11 | DPCM1 | PCM | 1st order DPCM | 1st order DPCM | 24 | 14 | 14 | 0 | 0 | 0 | 4 |
| DIAGONAL | 000 | DPCM2 | PCM | 1st order DPCM | 2nd order DPCM | 26 | 18 | 13 | 0 | 1 | 1 | 0 |
| | 001 | DPCM2 | PCM | 1st order DPCM | 2nd order DPCM | 25 | 17 | 13 | 0 | 1 | 1 | 5 |
| | 010 | DPCM2 | PCM | 1st order DPCM | 2nd order DPCM | 24 | 16 | 14 | 0 | 1 | 1 | 1 |
| | 011 | DPCM2 | PCM | 1st order DPCM | 2nd order DPCM | 23 | 15 | 14 | 0 | 1 | 1 | 3 |
| | 100 | DPCM1 | PCM | 1st order DPCM | 1st order DPCM | 22 | 14 | 14 | 0 | 1 | 1 | 5 |

FIG. 20

| 0 | 0 | Y0 | $\Delta$(Y1) | abs($\Delta\Delta$(Y2)) | Y2 sign | abs($\Delta\Delta$(Y3)) | Y3 sign | abs($\Delta\Delta$(Y4)) | Y4 sign | abs($\Delta\Delta$(Y5)) | Y5 sign | abs($\Delta\Delta$(Y6)) | Y6 sign | abs($\Delta\Delta$(Y7)) | Y7 sign |
|---|---|---|---|---|---|---|---|---|---|---|---|---|---|---|---|
| 0 | 1 | Y0 | $\Delta$(Y1) | abs($\Delta\Delta$(Y2)) | Y2 sign | abs($\Delta\Delta$(Y3)) | Y3 sign | abs($\Delta$(Y4)) | Y4 sign | abs($\Delta\Delta$(Y5)) | Y5 sign | abs($\Delta\Delta$(Y6)) | Y6 sign | abs($\Delta\Delta$(Y7)) | Y7 sign |
| 1 | 0 | Y0 | $\Delta$(Y1) | abs($\Delta\Delta$(Y2)) | Y2 sign | abs($\Delta\Delta$(Y3)) | Y3 sign | abs($\Delta\Delta$(Y4)) | Y4 sign | abs($\Delta\Delta$(Y5)) | Y5 sign | abs($\Delta\Delta$(Y6)) | Y6 sign | abs($\Delta\Delta$(Y7)) | Y7 sign |
| 1 | 1 | Y0 | $\Delta$(Y1) | $\Delta$(Y2) | | $\Delta$(Y3) | | $\Delta$(Y4) | | $\Delta$(Y5) | | $\Delta$(Y6) | | $\Delta$(Y7) | refinement |

```
Compute global parameters (STRAIGHT)
qnList            = [0:19 – targetBps];
depth1            = 27;                 % depth of 1st sample
depth2            = 17;                 % depth of 2nd sample
headerSize        = ceil(log2(length(qnList)));
FLC_length        = floor((8*targetBps – (depth1 – qn) – (depth2 – qn) – headerSize)/6);
RefinementBitsNum = 8*targetBps – (depth1 – qn) – (depth2 – qn) – headerSize –
                    6*FLC_length;

Compute global parameters (STRAIGHT,  targetBps = 16 case)
qnList            = [0 1 2 3];
depth1            = 27;                 % depth of 1st sample
depth2            = 17;                 % depth of 2nd sample
headerSize        = 2;
FLC_length        = [13 14 14 14];      % this is to code ??I(n)
RefinementBitsNum = [4 0 2 4];
```

FIG. 24

```
Compute global parameters (DIAGONAL)
qnList            = [0:20 – targetBps];
depth1            = 26;                 % depth of 1st sample
depth2            = 18;                 % depth of 2nd sample
headerSize        = ceil(log2(length(qnList)));
FLC_length        = floor((8*targetBps – (depth1 – qn) – (depth2 – qn) – headerSize)/6);
RefinementBitsNum = 8*targetBps – (depth1 – qn) – (depth2 – qn) – headerSize –
                    6*FLC_length;

Compute global parameters (DIAGONAL, targetBps = 16 case)
qnList            = [0 1 2 3 4];
depth1            = 26;                 % depth of 1st sample
depth2            = 18;                 % depth of 2nd sample
headerSize        = 3;
FLC_length        = [13 13 14 14 14];   % this is to code ??I(n)
RefinementBitsNum = [3 5 1 3 5];
```

FIG. 25

```
Per Block
% R = input block
% Mode Decision
for ii=1:length(qnList)
    Rq = R >> qnList(ii);
    ΔΔ  = Rq(3:end) – 2*Rq(2:end-1) + Rq(1:end-2);
    if ~any(abs( ΔΔ )>>(FLC_length(ii)-1)) || (ii==length(qnList))
        qnChosen = qnList(ii);
        iiChosen = ii;
        break;
    end
end
```

FIG. 26

```
Quantization
% bit-shift R
 Rq = R >> qnChosen;
```

FIG. 27

```
Compute Predictor
% Compute 8x1 Predictor block
Predictor(1)    = 0;                           % 1st sample is PCM coded
Predictor(2)    = Rq(1);                       % first derivative (2nd sample)
if qnChosen == qnList(end)                     % DPCM1 mode
        Predictor(3:8) = Rq(2:end-1);          % first derivative (the rest)
Else                                           % DPCM2 mode
        Predictor(3:8) = 2*Rq(2:end-1) - Rq(1:end-2);   % second derivative (the rest)
End
```

```
Compute Residual
% Compute 8x1 Residual block
Residual        = Rq – Predictor;
```

FIG. 29

```
FLC Residual
% compute FLC_size which indicates # of bits assigned to each Residual pixel
a           = depth1 – qnChosen;
b           = depth2 – qnChosen;
c           = FLC_length(iiChosen);
FLC_size    = [a b c c c c c c];
SignBit = Sign{2-(qnChosen == qnList(end))};        % DPCM1 or DPCM2
mode % put FLC in the bitstream
for ii=1:8
        binary    = bitget(Abs(Residual(ii)), FLC_size(ii)-SignBit(ii):-1:1);
        bitstream = [bitstream binary];
        if sign(ii)
            bitstream = [bitstream (Residual(ii)>=0)];
        end
end
```

FIG. 30

```
Put refinement bits in the bitstream
% R = input block
% refinement order is from left to right of qnChosen bit-plane
bitstream        = [bitstream Bitget(R(1:RefinementBitsNum(iiChosen)), qnChosen)];
```

FIG. 31

```
Decode FLC & Reconstruct Rq

% compute FLC_size which indicates # of bits assigned to each Residual pixel
a           = depth1 – qnChosen;
b           = depth2 – qnChosen;
c           = FLC_length(iiChosen);
FLC_size    = [a b c c c c c c];
SignBit = Sign{2-(qnChosen == qnList(end))};        % DPCM1 or DPCM2 mode % Reconstruct Rq block
[Rq(1), bitPos] = decodeFLC(bitstream, bitPos, FLC_size(1), signBit(1), 0);
[Rq(2), bitPos] = decodeFLC(bitstream, bitPos, FLC_size(2), signBit(2), Rq(1));
for ii = 3:8
    if qnChosen == qnList(end)
        pred = Rq(ii-1);
    else
        pred = 2*Rq(ii-1) - Rq(ii-2);        ← 3202
    end
    [Rq(ii), bitPos] = decodeFLC(bitstream, bitPos, FLC_size(ii), signBit(ii), pred);
end        ← 3204
```

```
Decode FLC
% a function that read each FLC & reconstruct Rq
function [Rq, bitPos] = decodeFLC(bitstream, bitPos, FLC_s, signB, predictor)
        cl      = FLC_s - signB;
        absR    = bitstream(bitPos+1:bitPos+cl)*bitshift(1,(cl-1:-1:0)');
        if signB
            sign    = 2*(bitstream(bitPos+cl+1)) - 1;
        else
            sign    = 1;
        end
        Residual = absR * sign;
        Rq       = Residual + predictor;
        bitPos   = bitPos + FLC_s;
```

FIG. 33

```
Bitshift Rq
Rrec = Rq << qnChosen;
```

FIG. 34

```
Reconstruct Refinement Bits rbn    = RefinementBitsNum(iiChosen);
Rqn    = qnChosen*ones(1, 8);
if qnChosen > 0
       Rrec(1:rbn) = bitset(Rrec(1:rbn), qnChosen, bitstream(bitPos+1:bitPos+rbn));
       Rqn(1:rbn)  = Rqn(1:rbn) – 1;
end
```

FIG. 35

```
Middle reconstruction of un-coded bits
I       = Rqn > 0;
Rrec(I) = bitset(Rrec(I), Rqn(I));
```

FIG. 36

IMAGE PROCESSING SYSTEM WITH RANDOM ACCESS CAPABLE INTEGRAL IMAGE COMPRESSION AND METHOD OF OPERATION THEREOF

TECHNICAL FIELD

The present invention relates generally to an image processing system, and more particularly to an image processing system with integral image compression with random access capability.

BACKGROUND ART

Modern consumer and industrial electronics, especially devices with a graphical imaging capability, such as cameras, televisions, projectors, cellular phones, and combination devices, are providing increasing levels of functionality to support modern life which require capturing and managing digital image information. Larger image format sizes and recording speeds require ever larger amounts of information to be digitally stored on digital media to capture images and video recordings. Research and development in the existing technologies can take a myriad of different directions.

As users become more empowered with the growth of imaging devices, new and old paradigms begin to take advantage of this new device space. There are many technological solutions to take advantage of this new imaging opportunity. One existing approach is to capture images on consumer, industrial, and mobile electronics such as digital cameras, smart phones with imaging capability, digital projectors, televisions, monitors, gaming systems, video cameras, or a combination devices, store the images in a storage system, process the images, and send the images to a display device.

Image capture and display systems have been incorporated in cameras, phones, projectors, televisions, notebooks, and other portable products. Today, these systems aid users by capturing and displaying available relevant information, such as images, graphics, text, or videos. The capture and display of digital images provides invaluable relevant information.

However, capturing, managing, and displaying information in digital images has become a paramount concern for the consumer. Mobile systems must store ever increasing amounts of digital image information in smaller physical storage spaces. Larger images consume more digital communication bandwidth during transmission, reducing the utility of remote image capture systems. Limiting the size of digital images decreases the benefit of using the tools.

Thus, a need still remains for better image processing system to capture and manage digital images. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of an image processing system, including: receiving a random access block of an integral image, the integral image formed by summing a portion of a source image received from an imaging device; calculating a chosen mode and a quantization number from the random access block; forming a quantized block by shifting the random access block based on the chosen mode; calculating a predictor block based on the quantized block calculating a residual block by subtracting the predictor block from the quantized block; calculating a fixed length coding residual based on the chosen mode and the residual block; and forming an image bitstream having the quantization number and the fixed length coding residual.

The present invention provides an image processing system, including: an imaging device for receiving a source image; a mode module, coupled to the imaging device, for receiving a random access block of an integral image formed by summing a portion of the source image, and for calculating a chosen mode and a quantization number from the random access block; a quantization module, coupled to the mode module, for forming a quantized block by shifting the random access block based on the chosen mode; a predictor module, coupled to the quantization module, for calculating a predictor block based on the quantized block; and a fixed length coding module, coupled to the predictor module, for calculating a residual block by subtracting the predictor block from the quantized block, for calculating a fixed length coding residual based on the chosen mode and the residual block, and for forming an image bitstream having the quantization number and the fixed length coding residual.

Certain embodiments of the invention have other steps or elements in addition to or in place of those mentioned above. The steps or element will become apparent to those skilled in the art from a reading of the following detailed description when taken with reference to the accompanying drawings.

BRIEF DESCRIPTION OF THE DRAWINGS

FIG. 14 is an example of a peak signal to noise ratio results for the straight image in a 32-bit Integral domain.

FIG. 15 is an example of a peak signal to noise ratio results for the straight image in an 8-bit pixel domain.

FIG. 16 is an example of a peak signal to noise ratio results for the diagonal image in a 32-bit Integral domain.

FIG. 17 is an example of a peak signal to noise ratio results for the diagonal image in an 8-bit pixel domain.

FIG. 18 is an example of the fixed length coding syntax.

FIG. 19 is an example of a mode map.

FIG. 20 is an example of the image bitstream for the straight image.

FIG. 21 is an example of reconstructed blocks for the straight image.

FIG. 22 is an example of the image bitstream for the diagonal image.

FIG. 23 is an example of reconstructed blocks for the diagonal image.

FIG. 24 is an example of the global control parameters for the straight image.

FIG. 25 is an example of the global control parameters for the diagonal image.

FIG. 26 is a pseudo code example for the mode module.

FIG. 27 is a pseudo code example for the quantization module.

FIG. 28 is a pseudo code example for the predictor module.

FIG. 29 is a pseudo code example for a compute residual function.

FIG. 30 is a pseudo code example for the fixed length coding module.

FIG. 31 is a pseudo code example for the refinement module.

FIG. 32 is a pseudo code example for the reconstruct quantized block module of the decoder.

FIG. 33 is a pseudo code example for the decode fixed length coding function of the decoder.

FIG. 34 is a pseudo code example for the bit-shift module of the decoder.

FIG. 35 is a pseudo code example for the reconstruct refinement bits module of the decoder.

FIG. 36 is a pseudo code example for the middle reconstruction module of the decoder.

BEST MODE FOR CARRYING OUT THE INVENTION

Figure 1:
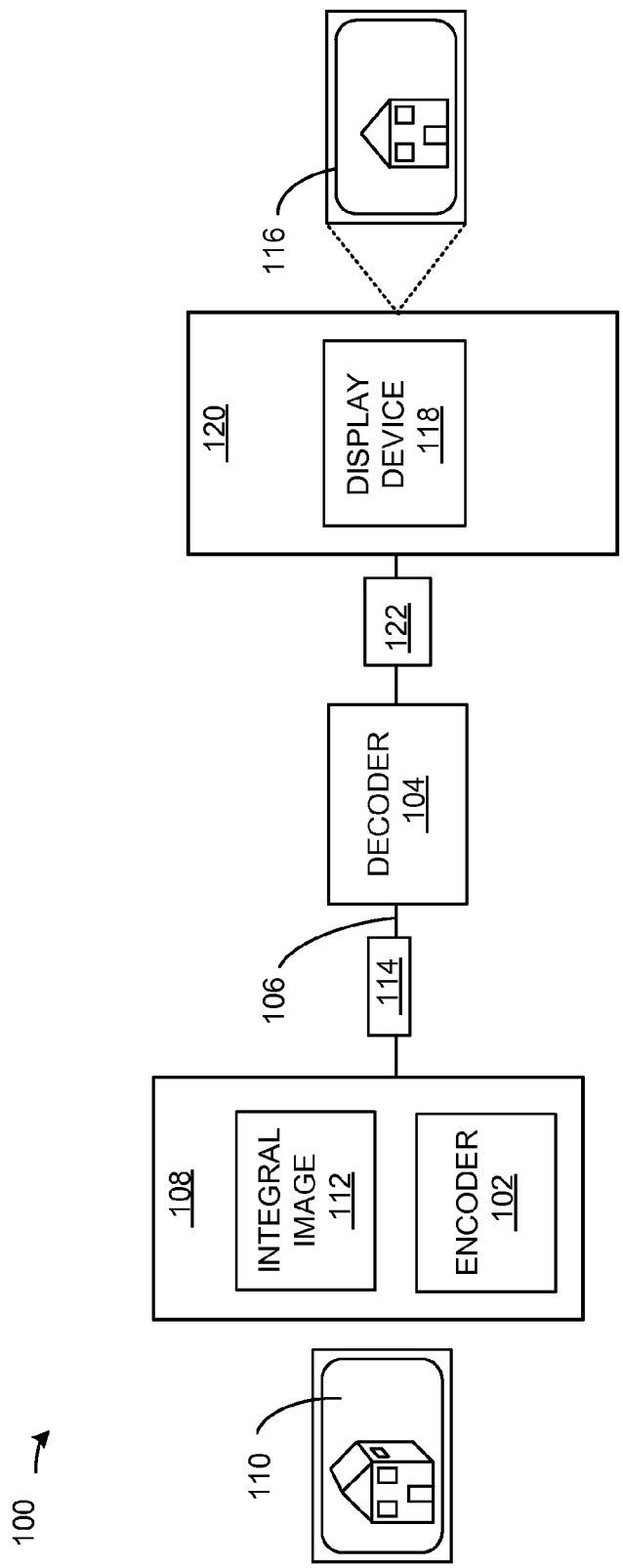
FIG. 1 is a block diagram of an image processing system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGs. is arbitrary for the most part. Generally, the invention can be operated in any orientation.

The same numbers are used in all the drawing FIGS. to relate to the same elements. The embodiments have been numbered first embodiment, second embodiment, etc. as a matter of descriptive convenience and are not intended to have any other significance or provide limitations for the present invention.

The term "image" is defined as a pictorial representation of an object. An image can include a two-dimensional image, three-dimensional image, video frame, a calculated file representation, an image from a camera, a video frame, or a combination thereof. For example, the image can be can be a machine readable digital file, a physical photograph, a digital photograph, a motion picture frame, a video frame, an x-ray image, a scanned image, or a combination thereof. The image can be formed by pixels arranged in a rectangular array. The image can include an x-axis along the direction of the rows and a y-axis along the direction of the columns.

The horizontal direction is the direction parallel to the x-axis of an image. The vertical direction is the direction parallel to the y-axis of an image. The diagonal direction is the direction non-parallel to the x-axis and non-parallel to the y-axis.

The term "module" referred to herein can include software, hardware, or a combination thereof. For example, the software can be machine code, firmware, embedded code, and application software. Also for example, the hardware can be circuitry, processor, graphical processing unit, digital signal processor, calculator, integrated circuit, integrated circuit cores, or a combination thereof.

Referring now to FIG. 1, therein is shown a block diagram of an image processing system 100 in an embodiment of the present invention. The image processing system 100 can encode and decode image information. An encoder 102 can receive an integral image 112 of a source image 110 and send an image bitstream 114 to a decoder 104 for decoding.

The encoder 102 can receive and encode the integral image 112 of the source image 110. The encoder 102 is a unit for encoding the integral image 112 into a different form.

The source image 110 is a digital representation of a scene of objects. The integral image 112 is a reduced resolution image where each pixel is the sum of a group of pixels. The integral image 112 can be generated from the source image 110 by summing groups of pixels. The integral image 112 can be used to facilitate further image processing such as facial recognition, pattern matching, or a combination thereof.

Encoding is defined as computationally modifying an image into a different form. For example, encoding can compress the integral image 112 of the source image 110 into the image bitstream 114 to reduce the amount of data needed to transmit the image bitstream 114.

The encoder 102 can code the integral image 112 to form the image bitstream 114. The image bitstream 114 is defined a sequence of bits representing information associated with an image. For example, the image bitstream 114 can be a bit sequence representing a compression of the integral image 112 of the source image 110.

In an illustrative example, the image bitstream 114 can be a serial bitstream sent from the encoder 102 to the decoder 104. In another illustrative example, the image bitstream 114 can be a data file stored on a storage device and retrieved for use by the decoder 104. The data file can be formed by encoding the integral image 112 using the encoder 102.

The encoder 102 can receive the integral image 112 of the source image 110 for a scene in a variety of ways. For example, the source image 110 representing objects in the real-world can be captured with an imaging device 108, such as an image camera, multiple cameras, imaging system, or a combination thereof.

The encoder 102 can encode the integral image 112 of the source image 110 to form the image bitstream 114. The source image 110 can be pre-processed to form the integral image 112.

The imaging device 108 can include the encoder 102 and the integral image 112. For example, the imaging device 108 can form the integral image 112 from the source image 110. The imaging device 108 can be a digital camera, an imaging system, an image recognition system, a medical device, or a combination thereof.

The image processing system 100 can include the decoder 104 for decoding the image bitstream 114. The decoder 104 is defined as a unit for receiving the image bitstream 114 and modifying the image bitstream 114 to form a reconstructed image 122.

Decoding is defined as computationally modifying the image bitstream 114 to form the reconstructed image 122. For example, decoding can decompress the image bitstream 114 to form the reconstructed image 122, which can be the integral image 112. The reconstructed image 122 can be used for further image processing or for display on a display device 118.

In an illustrative example, the display device 118 can be an enhanced device with a display for presenting image information and meta-information. The reconstructed image 122 can be used for a facial recognition application which can then be used to overlay personal identification information over the source image 110 for display on a display unit 120 such as a smart phone display, a digital projector, a DVD player display, or a combination thereof.

In another illustrative example, the integral image 112 can be extracted from the image bitstream 114 and used for a variety of image processing functions, including gesture recognition, facial cognition, pattern matching, or a combination thereof. Forming and compressing the integral image 112 can facilitate the processing of the source image 110.

The encoder 102 can send the image bitstream 114 to the decoder 104 in a variety of ways. For example, the encoder 102 can send the image bitstream 114 to the decoder 104 over a communication link 106. In another example, the encoder 102 can send the image bitstream 114 as a data file on a storage device. The decoder 104 can access the data file to receive the image bitstream 114.

The communication link 106 can be a variety of networks suitable for data transfer. For example, the communication link 106 can include wireless communication, wired communication, optical, infrared, or the combination thereof. Satellite communication, cellular communication, terrestrial communication, Bluetooth, Infrared Data Association standard (IrDA), wireless fidelity (WiFi), and worldwide interoperability for microwave access (WiMAX) are examples of wireless communication that can be included in the communication link 106. Ethernet, digital subscriber line (DSL), fiber to the home (FTTH), digital television, and plain old telephone service (POTS) are examples of wired communication that can be included in the communication link 106.

The encoder 102 and the decoder 104 can be implemented in a variety of ways. For example, the encoder 102 and the decoder 104 can be implemented using hardware, software, or a combination thereof. For example, the encoder 102 can be implemented with custom circuitry, a digital signal processor, microprocessor, or a combination thereof. In another example, the decoder 104 can be implemented with custom circuitry, a digital signal processor, graphical processing unit, microprocessor, or a combination thereof.

Figure 2:
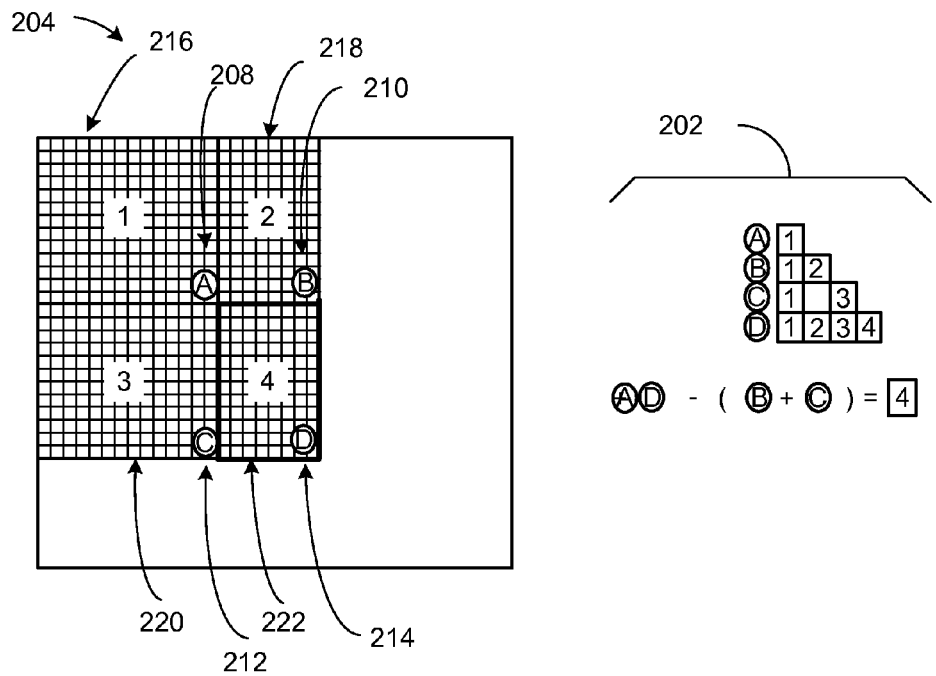
FIG. 2 is an example of the straight image.

Referring now to FIG. 2, therein is shown an example of a straight image 204. The straight image 204 can represent the integral image 112 of FIG. 1 having horizontal and vertical structure.

The straight image 204 can be used to calculate a summed area table 202 used to represent the pixels of the source image 110 of FIG. 1 in the integral image 112. Each pixel in the straight image 204 can be the sum of all the pixel values above and to the left of the original pixel, including the value of the original pixel.

Each of the pixels of the straight image 204 can be the sum of a portion of the source image 110. For example, the pixel of the straight image 304 can be the sum of an 8×8 pixel portion of the source image 110. The size of the portion of the source image 110 can vary.

In an illustrative example, for a first pixel 208 at point A, the pixel value is the sum of all of the pixels above and to the left of the first pixel 208 that form a first block 216. For a second pixel 210 at point B, the pixel value is the sum of all of the pixels above and to the left, which includes the pixel value for the first pixel 208 plus the sum of the pixel values between the first block 216 and the a second block 218 representing the area allocated for the second pixel 210.

For a third pixel 212 at point C, the pixel value is the sum of all the pixels above and to the left of the third pixel 212. The pixel value includes the sum of the pixels in the first block 216 representing the first pixel 208 plus the sum of the pixel values between the first block 216 and a third block 220 representing the area allocated for the third pixel 212.

For a fourth pixel 214 at point D, the pixel value is the sum of all the pixels above and to the left of the fourth pixel 214. The pixel value includes the sum of the pixels in the first block 216, the second block 218, and the third block 220 plus the sum of the pixel values between a fourth block 222 of the fourth pixel 214 and the first block 216, the second block 218, and the third block 220.

It has been discovered that the pixel values for the straight image 204 can be calculated quickly because the summed area for the fourth pixel 214 can be calculated by determining the area for the area of the fourth block 222 and then adding the summed areas of the first block 216, the second block 218, and the third block 220, which have already been calculated.

Figure 3:
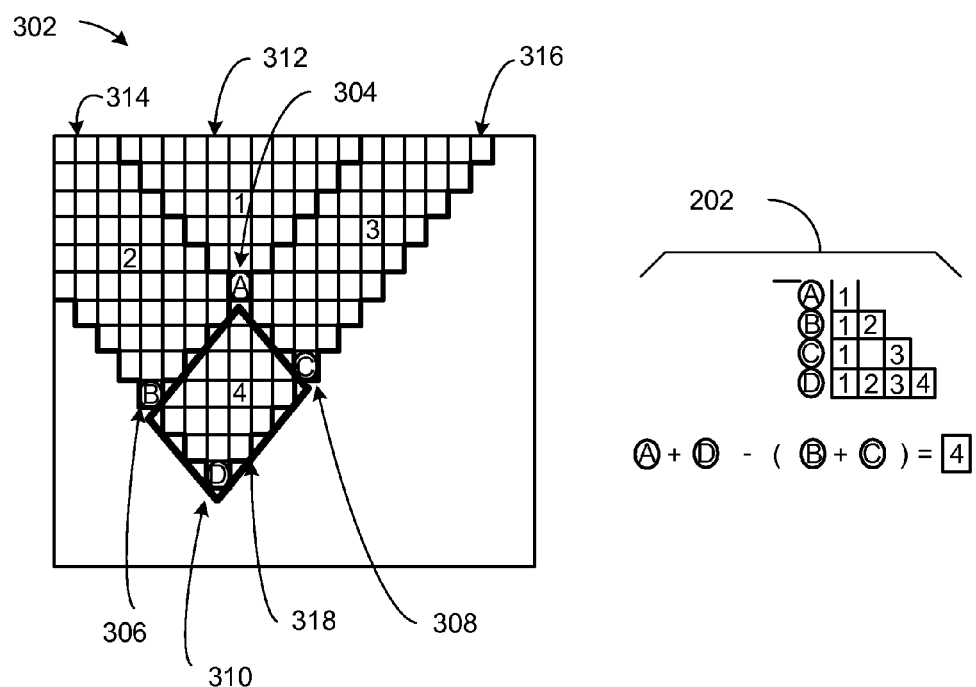
FIG. 3 is an example of the diagonal image.

Referring now to FIG. 3, therein is shown an example of a diagonal image 302. The diagonal image 302 can represent the integral image 112 of FIG. 1 having a diagonal structure.

The diagonal image 302 can be used to calculate the summed area table 202 used to represent the pixels of the source image 110 of FIG. 1 in the integral image 112. Each pixel in the diagonal image 302 can be the sum of all the pixel values angled upward to the left and right at a forty-five degree angle from the original pixel and extending to the borders of the image, including the value of the original pixel.

Each of the pixels of the diagonal image 302 can be the sum of a portion of the source image 110. For example, the pixel of the diagonal image 302 can be the sum of an 8×8 pixel portion of the source image 110. The size of the portion of the source image 110 can vary.

In an illustrative example, for a first diagonal pixel 304 at point A, the pixel value is the sum of all of the pixels angled upward from the first diagonal pixel 304 that form a first diagonal block 312. For a second diagonal pixel 306 at point B, the pixel value is the sum of all of the pixels above and to the left, which includes the pixel value for the first diagonal pixel 304 plus the sum of the pixel values between the first diagonal block 312 and the a second diagonal block 314 representing the area allocated for the second diagonal pixel 306.

For a third diagonal pixel 308 at point C, the pixel value is the sum of all the pixels angled upward from the third diagonal pixel 308. The pixel value includes the sum of the pixels in the first diagonal block 312 representing the first diagonal pixel 304 plus the sum of the pixel values between the first diagonal block 312 and a third diagonal block 316 representing the area allocated for the third diagonal pixel 308.

For a fourth diagonal pixel 310 at point D, the pixel value is the sum of all the pixels angled upward from the fourth diagonal pixel 310. The pixel value includes the sum of the pixels in the first diagonal block 312, the second diagonal block 314, and the third diagonal block 316 plus the sum of the pixel values between the block of the fourth diagonal pixel 310 and the first diagonal block 312, the second diagonal block 314, and the third diagonal block 316.

It has been discovered that the pixel values for the diagonal image 302 is calculated quickly because the summed area for the fourth diagonal pixel 310 are calculated by determining the area for the area of a fourth diagonal block 318 and then adding the summed areas of the first diagonal block 312, the second diagonal block 314, and the third diagonal block 316, which have already been calculated.

Figure 4:
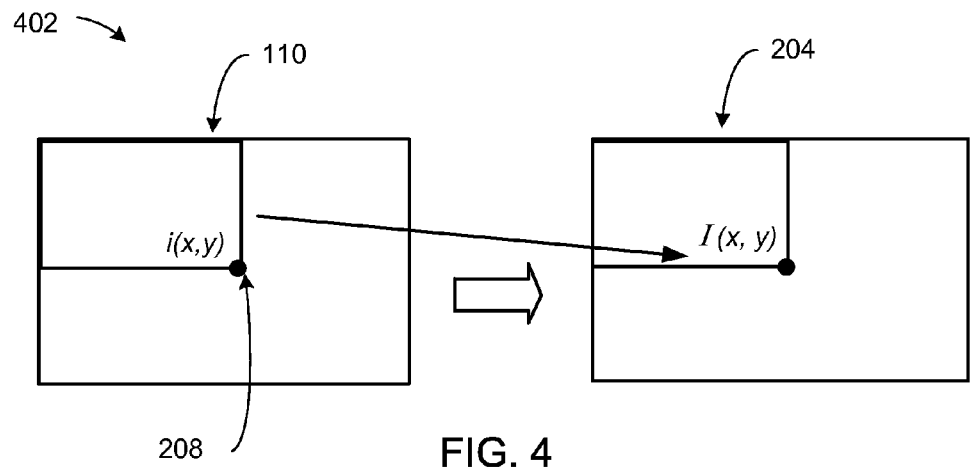
FIG. 4 is an example of a straight integral image conversion.

Referring now to FIG. 4, therein is shown an example of a straight integral image conversion 402. The straight integral image conversion 402 can form the straight image 204 from the source image 110 by forming the summed area table.

Each of the pixels in the straight image 204 is formed by summing the pixels in the source image 110 that are in an area formed from the first pixel 208. The pixel values for the straight image 204 can be calculated by:

$$I(x, y) = \sum_{\substack{1 \le a \le x \\ 1 < b < y}} i(a, b) \quad (1)$$

where i(a, b) represent the pixels in the source image 110, I(x, y) represents the pixels in the straight image 204.

In an illustrative example, each of the pixels in the integral image 112 can be the sum of the pixel values for an 8×8 block of pixels in the source image 110. The integral image 112 is a summed area table representation of the source image 110.

Figure 5:
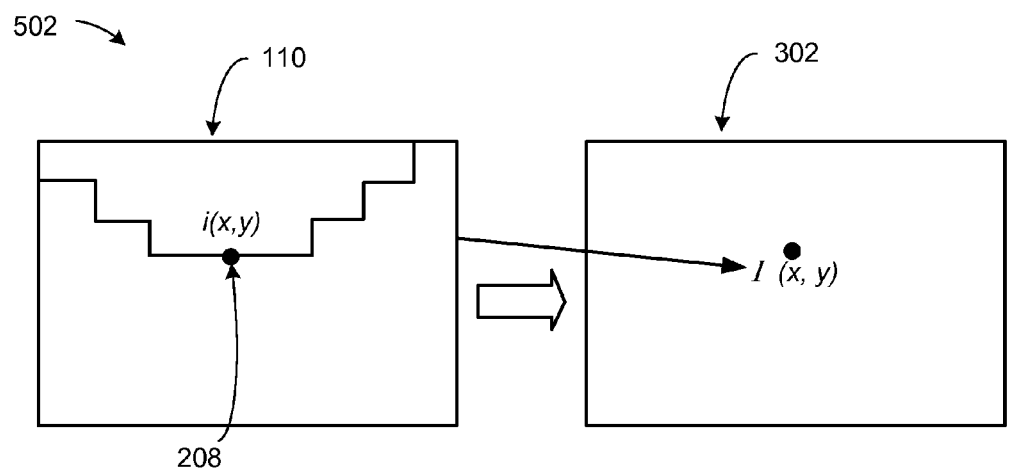
FIG. 5 is an example of a diagonal integral image conversion.

Referring now to FIG. 5, therein is shown an example of a diagonal integral image conversion 502. The diagonal integral image conversion 502 can form the diagonal image 302 from the source image 110 by forming a summed area table.

Each of the pixels in the diagonal image 302 is formed by summing the pixels in the source image 110 that are in an area associated with the first pixel 208. The area associated with the first pixel 208 can be all of the pixels upward left and right of the first pixel 208. The pixel values for the straight image 204 can be calculated by:

$$I(x, y) = \sum_{shaded\ area} i(a, b) \quad (2)$$

where i(a, b) represent the pixels in the source image 110, I(x, y) represents the pixels in the diagonal image 302.

In an illustrative example, each of the pixels in the integral image 112 can be the sum of the pixel values for an 8×8 block of pixels in the source image 110. The integral image 112 is a summed area table representation of the source image 110.

Figure 6:
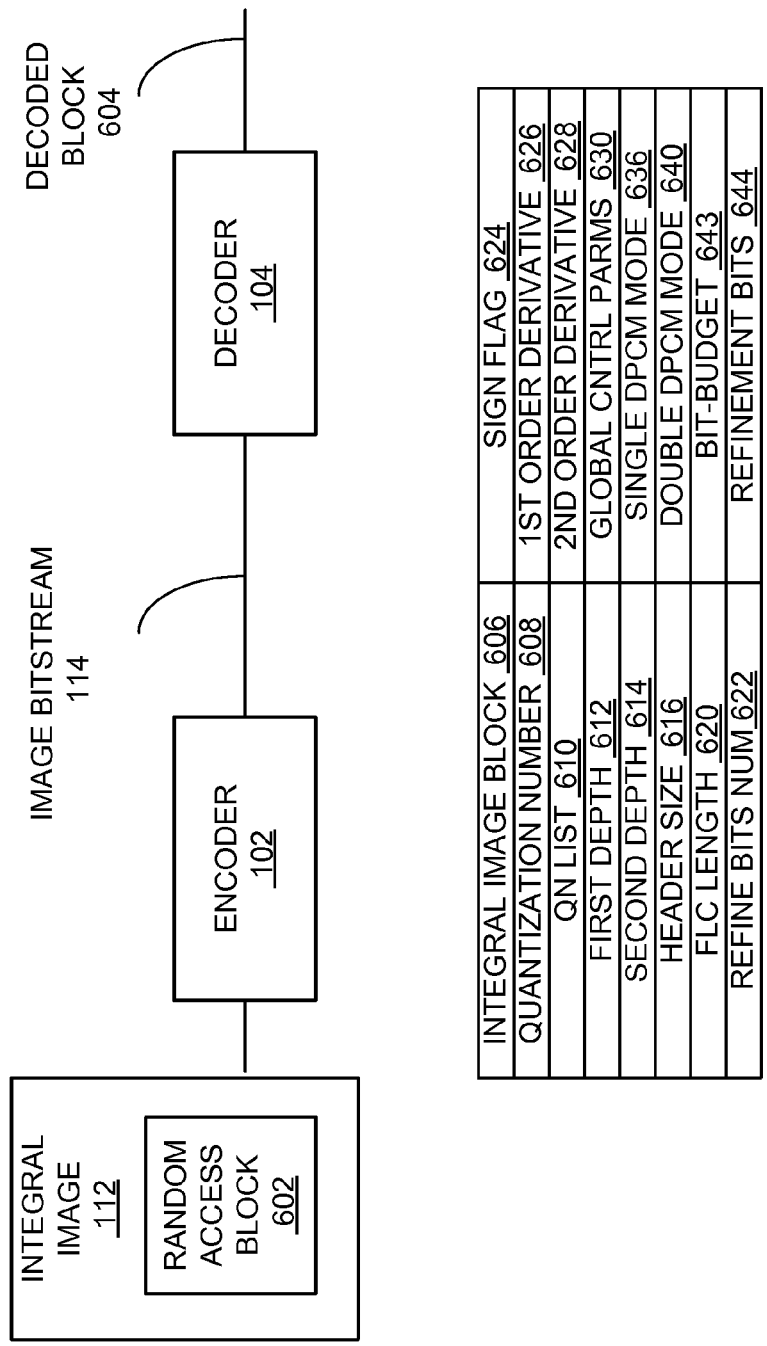
FIG. 6 is an example of the encoder and the decoder.

Referring now to FIG. 6, therein is shown an example of the encoder 102 and the decoder 104. The encoder 102 can form the image bitstream 114 by compressing the integral image 112. The decoder 104 can form the integral image 112 of FIG. 1 having a decoded block 604 decompressed from the image bitstream 114.

The integral image 112 can be divided into integral image blocks 606. Each of the integral image blocks 606 is a portion of the integral image 112. The integral image blocks 606 can be arrays of eight pixels (8×1). The integral image blocks 606 can include a random access block 602. The random access block 602 can be any block extracted from the integral image 112. The random access block 602 can be accessed directly without sequential limitations.

The integral image blocks 606 can be represented by a vector having one pixel entry for each element. For example, the 8×1 random access values for the integral image blocks can be:

$$I(n)=[I(1)I(2)I(3)I(4)I(5)I(6)I(7)I(8)] \quad (3)$$

where each I(n) element represents an 8-bit pixel value.

Each of the integral image blocks 606 can have a first order derivative 626 and a second order derivative 628 which can be calculated as follows:

First order derivative: $\Delta I(n)=I(n)-I(n-1)$ (4)

Second order derivative: $\Delta\Delta I(n)=I(n)-2I(n-1)+I(n-2)$ (5)

Both the encoder 102 and the decoder 104 can share access to a set of global control parameters 630. For example, the global control parameters can include a quantization number list 610. The quantization number list 610 is a set of numbers representing the number of quantization bits.

The global control parameters 630 can include a first depth 612. The first depth 612 is a value indicating the number of bits needed to fully represent all of the pixels of the integral image 112. The first depth 612 can be an expression of the dynamic range of the integral image 112. The first depth 612 can be represented by the number of bits needed to represent the dynamic range of the random access block 602.

The global control parameters 630 can include a second depth 614. The second depth 614 is a value representing the number of bits needed to represent the first order derivative 626 of the random access block 602. The second depth 614 can represent the number of bits needed to represent the dynamic range of the first order derivative 626 of the random access block 602.

The values of the first depth 612 and the second depth 614 will vary based on the type of the integral image 112. The integral image 112 can be the straight image 204 of FIG. 2 or the diagonal image 302 of FIG. 3. The first depth 612 and the second depth 614 can also vary based on the image size and the bit-depth for each pixel.

In an illustrative example, the straight image 204 can be a 32 bit depth integral image representing the source image 110 having dimensions of 640×480 8-bit pixels, a video graphics adapter (VGA) image, such as a VGA 8-bit luma image. The first depth 612 of the straight image 204 can be represented with 27 bits and calculated as:

$$0 \le I(n) \le 480 \times 640 \times 255\ \log_2(480 \times 640 \times 255) \le 27\ bits \quad (6)$$

where I(n) is one of the pixels of the integral image 112 and the integral image 112 can be represented by less than 27 bits.

The second depth 614 of the straight image 204 can be expressed as the first order derivative 626 and can be represented with 17 bits as:

$$0 \le \Delta I(n) \le 480 \times 255\ \log_2(480 \times 255) \le 17\ bits \quad (7)$$

The second order derivative 628 of the straight image 204 can be expressed with 18 bits as:

$$-480 \times 255 \le \Delta\Delta I(n) \le 480 \times 255\ \log_2(480 \times 255) + 1\ bit\ (sign) \le 18\ bits \quad (8)$$

In another illustrative example, the diagonal image 302 can be a 32 bit depth integral image representing an 8-bit VGA image, such as a VGA 8-bit luma image. The first depth 612 of the diagonal image 302 can be represented with 26 bits and calculated as:

$$0 \leq I(n) \leq 480 \times 640 \times 255 - 320 \log 2(480 \times 640 \times 255 - 320) \leq 26 \text{ bits} \quad (9)$$

The second depth 614 of the diagonal image 302 can be expressed as the first order derivative 626 and can be represented with 18 bits as:

$$-480 \times 255 \leq \Delta I(n) \leq 480 \times 255 \log 2(480 \times 255) + 1 \text{ bit (sign)} \leq 18 \text{ bits} \quad (10)$$

The second order derivative 628 of the diagonal image 302 can be expressed with 19 bits as:

$$-480 \times 255 \times 2 \leq \Delta \Delta I(n) \leq 480 \times 255 \times 2 \log 2(480 \times 255 \times 2) + 1 \text{ bit(sign)} \leq 19 \text{ bits} \quad (11)$$

The global control parameters 630 can include a header size 616. The header size 616 is number of bits needed to represent a quantization number 608. The header size 616 defined the size of the header in the image bitstream 114.

The global control parameters 630 can include a fixed length coding length 620. The fixed length coding length 620 is the length of the code word used for fixed length encoding.

For example, for a given bit-budget and the quantization number 608, only a certain number of bits per sample are available to code the residual sample. The fixed length coding length 620 is the number of bits per sample for coding the residual sample. If the residual sample with the quantization number 608 equal to zero is too large to code using a fixed length coding technique with the given value of the fixed length coding length 620, then the quantization number 608 can be increased. If the quantization number 620 is increased, then typical values for the residual value decrease. In addition, the fixed length coding length 620 can be increased.

The global control parameters 630 can include a refinement bits number 622. The refinement bits number 622 is the size of the refinement bits.

The global control parameters can include a sign flag 624. The sign flag 624 can indicate if the sign needs to be coded.

The encoder 102 and the decoder 104 can support two modes of compression and apply the appropriate mode based on the data in the random access block 602. The first mode is a single differential pulse code modulation mode 636 which can compress the random access block 602 in any configuration. The single differential pulse code modulation mode 636 can calculate the first order derivative 626 of the data in the random access block 602 using a fixed length coding process.

The second mode is a double differential pulse code modulation mode 640 which can calculate the second order derivative 628 of the random access block 602 using a fixed length coding process. The double differential pulse code modulation mode 640 can provide improved compression, but is only appropriate for certain data sets. The encoder 102 can improve performance by selecting the appropriate compression mode based on the data in the random access block 602.

The single differential pulse code modulation mode 636 can be implements using the following steps. First, the random access block 602 is uniformly quantized. Each of the elements of the random access block 602 can be right shifted to remove the lower order bits of each element.

Second, a pulse code modulation operation can be performed on the first element, Iq(1) of the quantized data. The depth in bits of the calculated data is calculated as the first depth 612 minus the quantization number 608.

Third, a fixed length coding of the first order derivative 626 of the remaining elements in the random access block 602 can be calculated with the depth set to the value of the second depth 614 minus the quantization number 608. This first order derivative 626 can be calculated as shown in Equation 4.

Finally, any leftover bits that accounted for, such as the data removed during the quantization process, can be identified as refinement bits 644. The information from the pulse code modulation data, the fixed length coding data, and the refinement bits 644 can completely define the data in the random access block 602.

The quantization number 608 for the single differential pulse code modulation mode 636 can be calculated by first determining a bit-budget 643 as follows:

$$\text{bit-budget} \geq (\text{depth1} - qn) + (\text{depth2} - qn) \times (\text{blocksize} - 1) + \text{headerSize} \quad (12)$$

where depth1 if the first depth 612, depth2 is the second depth 614, the blocksize is a constant, and the headerSize is the header size 616.

The quantization number 608 for the straight image 204 in the single differential pulse code modulation mode 636 can be calculated as:

$$\text{quantization number} = 19 - \text{targetBps} \rightarrow \text{quantization number} = 3 @ 16 \text{ bps} \quad (13)$$

The quantization number 608 for the diagonal image 302 in the single differential pulse code modulation mode 636 can be calculated as:

$$\text{quantization number} = 20 - \text{targetBps} \rightarrow \text{quantization number} = 4 @ 16 \text{ bps} \quad (14)$$

where quantization number is the quantization number 608.

The single differential pulse code modulation mode 636 can code any block in the integral image 112 and can be used as a failsafe or safeguard mode for encoding the data. The single differential pulse code modulation mode 636 can limit the worst error and can code the most challenging blocks.

The double differential pulse code modulation mode 640 can be implements using the following steps. First, the random access block 602 is uniformly quantized. Each of the elements of the random access block 602 can be right shifted to remove the lower order bits of each element.

Second, a pulse code modulation operation can be performed on the quantized value of the first element, Iq(1), of the random access block 602. The depth in bits of the calculated data is calculated as the first depth 612 minus the quantization number 608.

Third, a fixed length coding of the first order derivative 626 of the second element, Iq(1), in the random access block 602 can be calculated with the depth set to the value of the second depth 614 minus the quantization number 608. This first order derivative 626 can be calculated as shown in Equation 4.

Fourth, a fixed length coding of the second order derivative 628 of the remaining elements in the random access block 602, ΔΔIq(3~8), can be calculated with the depth set to the fixed length coding length 620. This second order derivative 628 can be calculated as shown in Equation 5.

Finally, any leftover bits that accounted for, such as the data removed during the quantization process, can be identified as the refinement bits 644. The information from the pulse code modulation data, the fixed length coding data, and the refinement bits 644 can completely define the data in the random access block 602.

The quantization number 608 for the double differential pulse code modulation mode 640 can be determining if the quantization number 608 is in the range of zero to the value of the quantization number 608 of the single differential pulse code modulation mode 636 minus 1. For example, if the target bits per second value is 16 bps, the quantization number 608 for the straight image 204 is (0, 1, 2). The quantization number 608 for the diagonal image 302 is (0, 1, 2, 3).

The fixed length coding length 620 can be determined from the Equation 15 for the bit-budget as follows:

$$\text{bit-budget} \geq (\text{depth1} - qn) + (\text{depth2} - qn) + \text{FLC\_length} \times (\text{blocksize} - 2) + \text{headerSize} \quad (15)$$

where depth1 if the first depth 612, depth2 is the second depth 614, the blocksize is a constant, and the headerSize is the header size 616.

It has been discovered that calculating the first order derivative 626 for the image bitstream 114 increase flexibility and improves performance. Calculating the first order derivative 626 of the random access block 602 allows the encoding of all of the integral image 112.

It has been discovered that calculating the second order derivative 628 for the image bitstream 114 increase flexibility and improves performance. Calculating the second order derivative 628 allows for faster encoding of the integral image 112.

It has been discovered that calculating the second order derivative 628 using Equation 5 improves performance. Calculating the second order derivative 628 with Equation 5 provides a simplified mechanism for calculating the second order derivative 628 with less processing overhead.

Figure 7:
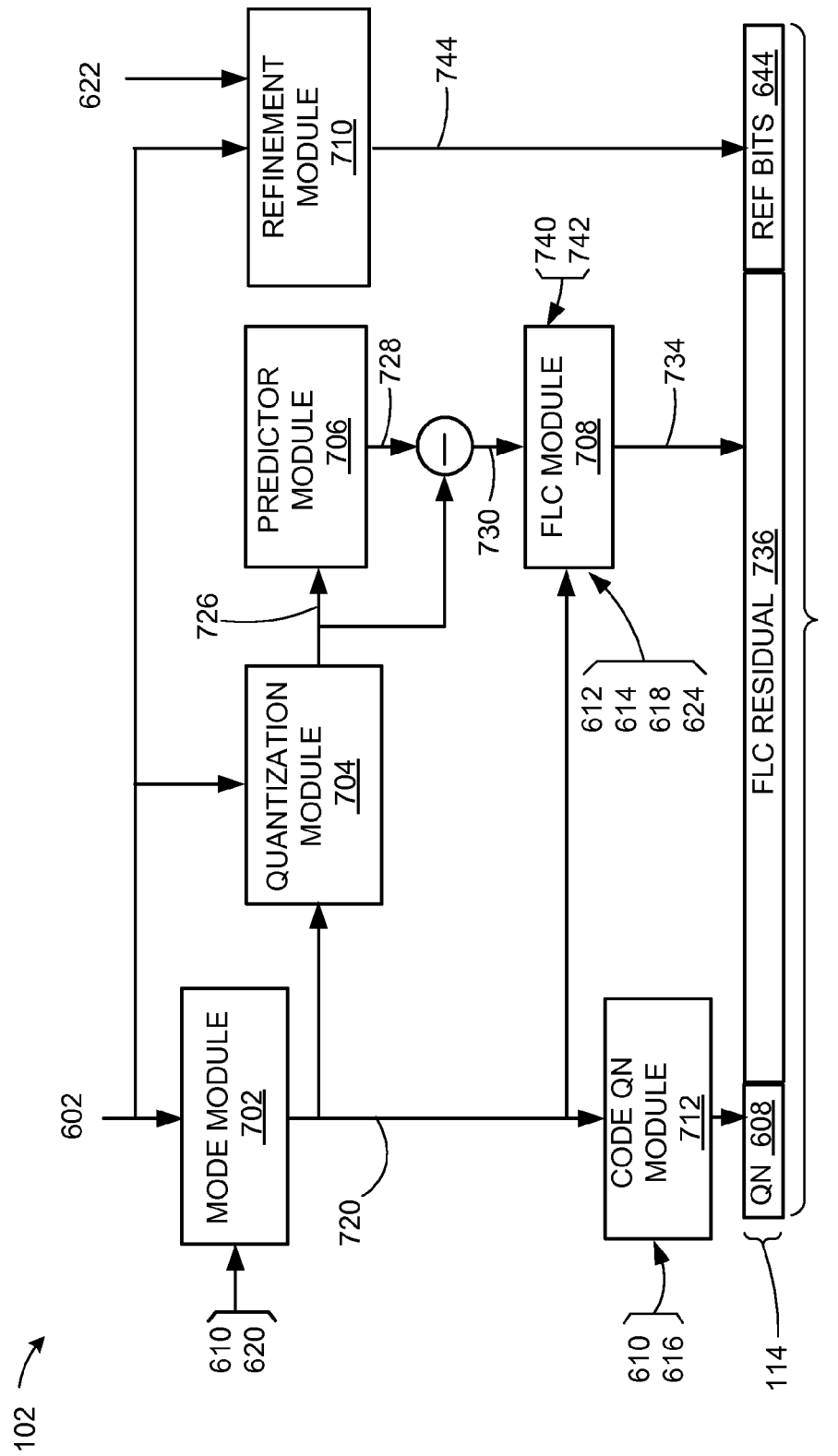
FIG. 7 is an example of the encoder.

Referring now to FIG. 7, therein is shown an example of the encoder 102. The encoder 102 is a unit for transforming the integral image 112 of FIG. 1 into the image bitstream 114.

The encoder 102 can receive the random access block 602 of the integral image 112 and form the image bitstream 114. The encoder 102 can include a mode module 702, a quantization module 704, a predictor module 706, a fixed length coding module 708, a refinement module 710, and a code quantization number module 712.

The mode module 702 can receive the random access block 602, the quantization number list 610, and the fixed length coding length 620 to calculate a chosen mode 720. The chosen mode 720 selects the type of compression used to form the image bitstream 114. The chosen mode 720 can indicate the single differential pulse code modulation mode 636 of FIG. 6 (DPCM1) or a double differential pulse code modulation mode 640 of FIG. 6 (DPCM2). The calculation of the chosen mode 720 is shown in detail in the pseudo code section below.

If the random access block 602 is from the straight image 204 of FIG. 2, then the chosen mode 720 can be set to the single differential pulse code modulation mode 636 if the quantization number is 3 or set to the double differential pulse code modulation mode 640 if the quantization number is 0, 1, or 2. If the random access block 602 is from the diagonal image 302 of FIG. 3, then the chosen mode 720 can be set to the single differential pulse code modulation mode 636 if the quantization number is 4 or set to the double differential pulse code modulation mode 640 if the quantization number is 0, 1, 2, or 3.

The code quantization number module 712 can receive the quantization number list 610, the header size 616, and the chosen mode 720 to insert the quantization number 608 into the image bitstream 114. The code quantization number module 712 be inserted into the image bitstream 114 with bit width set to the value of the header size 616.

The quantization module 704 can receive the random access block 602 and the chosen mode 720 to form a quantized block 726. The quantized block 726 is a modification of the random access block 602 with reduced resolution. The chosen mode 720 can be received from the mode module 702. The quantization module 704 can form the quantized block 726 by right bit shifting the random access block 602 by the number of bits indicated by numerical value of the chosen mode 720.

The predictor module 706 can receive the quantized block 726 from the quantization module 704 to calculate a predictor block 728. The predictor block 728 is a mode-dependent subset of the quantized block 726. The predictor module 706 is described in detail in the pseudo code section below.

The fixed length coding module 708 can receive the chosen mode and a residual block 730 to calculate a fixed length coding block 734. The fixed length coding block 734 can include a fixed length coding residual 736. The residual block 730 is the difference between the quantized block 726 and the predictor block 728. The residual block 730 can be calculated by subtracting the predictor block 728 from the quantized block 726. The fixed length coding module 708 can also access the global parameters including the first depth 612, the second depth 614, the fixed length coding length 620, and the sign flag 624.

The fixed length coding block 734 can have a fixed length coding syntax 732 defining the structure of the fixed length coding block 734. The fixed length coding block 734 is organized into sets of the absolute value of the elements of the residual block 730 grouped with the sign flag 624 for each element of the residual block 730.

In an illustrative example, the fixed length coding block 734 can have exceptions to the fixed length coding syntax 732 where the sign bit is not used. The first element of the residual block 730 is always non-negative. Where the pulse code modulation is zero, a pulse code modulation coding results.

The second element of the residual block 730 for the straight image 204 is always a non-negative value and the sign flag 624 is not included in the fixed length coding syntax 732. The sign flag 624 of the global parameters encoded the sign bit exceptions.

The fixed length coding module 708 can calculate a fixed length coding size 740 based on the first depth 612, the second depth 614, and the fixed length coding length 620. The fixed length coding module 708 can calculate a sign bit 742 for the fixed length coding size 740.

The fixed length coding module 708 can calculate the fixed length coding block 734 for the image bitstream 114 based on the fixed length coding size 740 and the sign bit 742. The calculation of the fixed length coding size 740 and the fixed length coding block 734 are described in further detail in the pseudo code section below.

The fixed length coding module 708 can insert the fixed length coding block 734 into the image bitstream 114. The fixed length coding block 734 has a size in the image bitstream 114 calculated by:

$$(\text{depth1} - qn) + (\text{depth2} - qn) + \text{FLC\_length}(qn) \times 6 \text{ bits} \quad (16)$$

where depth1 is the first depth 612, depth2 is the second depth 614, quantization number is the quantization number 608, and FLC_length is the fixed length coding length 620.

The refinement module 710 can receive the random access block 602 and the refinement bits number 622 for calculating a refinement bits block 744. The refinement bits block 744 is the non-quantized information from the random access block 602. The refinement bits block 744 includes the refinement bits 644. The calculation of the refinement bits block 744 is described in further detail in the pseudo code section below. The refinement module 710 can insert the refinement bits block 744 into the image bitstream 114.

The encoder 102 can form the image bitstream 114 from the integral image 112. The compressed information of the image bitstream 114 can be sent to the decoder 104 of FIG. 1 or stored for later conversion back to the original image.

It has been discovered that calculating the image bitstream 114 based on the chosen mode 720 increase flexibility and improves performance. Selecting the first order derivative 626 of FIG. 6 of the random access block 602 or the second order derivative 628 of FIG. 6 of the random access block 602 based on the chosen mode 720 reduces processing time by compressing a subset of the data to be processed faster using the second order derivative 628, while allowing all other blocks to be processed with the first order derivative 626.

Figure 8:
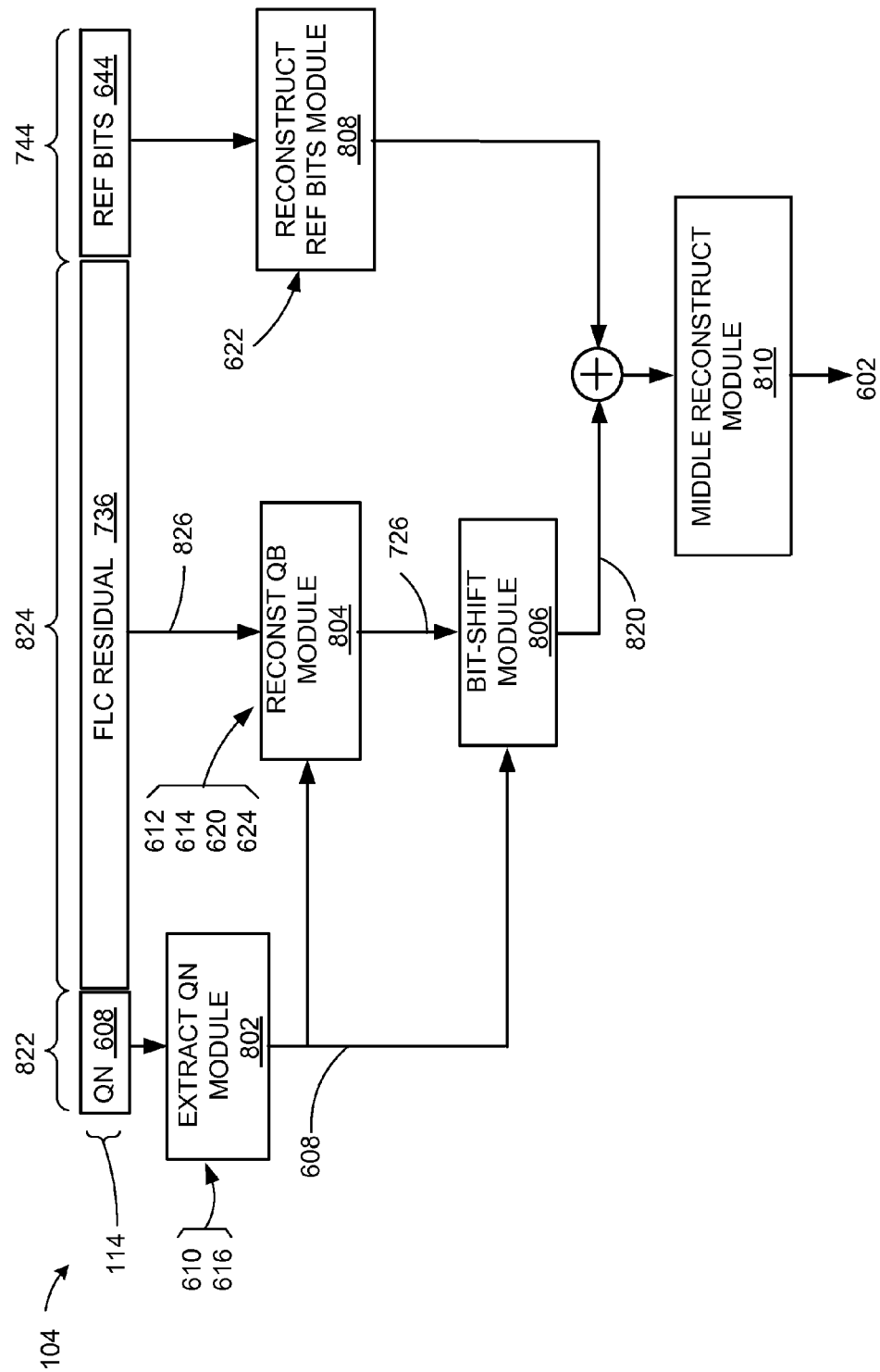
FIG. 8 is an example of the decoder.

Referring now to FIG. 8, therein is shown an example of the decoder 104. The decoder 104 is a unit for transforming the image bitstream 114 back into the integral image 112 of FIG. 1.

The decoder 104 can receive the image bitstream 114 and decompress the information to form the random access block 602 of the integral image 112. The decoder 104 can include an extract quantization number module 802, a reconstruct quantized block module 804, a bit-shift module 806, a reconstruct refinement bits module 808, and a middle reconstruction module 810.

The extract quantization number module 802 can receive the image bitstream 114, the quantization number list 610, and the header size 616 for detecting and extracting the quantization number 608 from the image bitstream 114. The extract quantization number module 802 can extract a quantization number field 822 from the image bitstream 114 and form the quantization number 608. The quantization number field 822 is a portion of the image bitstream 114. The quantization number field 822 has a width determined by the value of the header size 616.

The reconstruct quantized block module 804 can receive the image bitstream 114, the quantization number 608, the fixed length coding residual 736, the first depth 612, the second depth 614, the fixed length coding length 620, and the sign flag 624 for reforming the quantized block 726. The reconstruct quantized block module 804 can extract the fixed length coding information, such as a single fixed length coding field 824 and a double fixed length coding field 826, from the image bitstream 114. The single fixed length coding field 824 is a portion of the image bitstream 114. The double fixed length coding field 826 is a portion of the image bitstream 114. The quantized block 726 can be recalculated losslessly. The calculation of the quantized block 726 is described in further detail in the pseudo code section below.

The bit-shift module 806 can receive the quantized block 726 and the quantization number 608 to form a partial block 820. The partial block 820 is the result of left-shifting the quantized block 726 by the number of bits indicated by the value of the quantization number 608.

The reconstruct refinement bits module 808 can receive the image bitstream 114, the refinement bits 644, and the refinement bits number 622 to form the refinement bits block 744. The calculation of the refinement bits block 744 is described in further detail in the pseudo code section below.

The middle reconstruction module 810 can receive the summation of the partial block 820 and the refinement bits block 744 to form the random access block 602 of the integral image 112. The calculation of the random access block 602 is described in further detail in the pseudo code section below.

The decoder 104 can form the integral image 112 from the image bitstream 114. The image bitstream 114 can be received from the encoder 102 of FIG. 1 or retrieved as a stored file from a storage unit.

Figure 9:
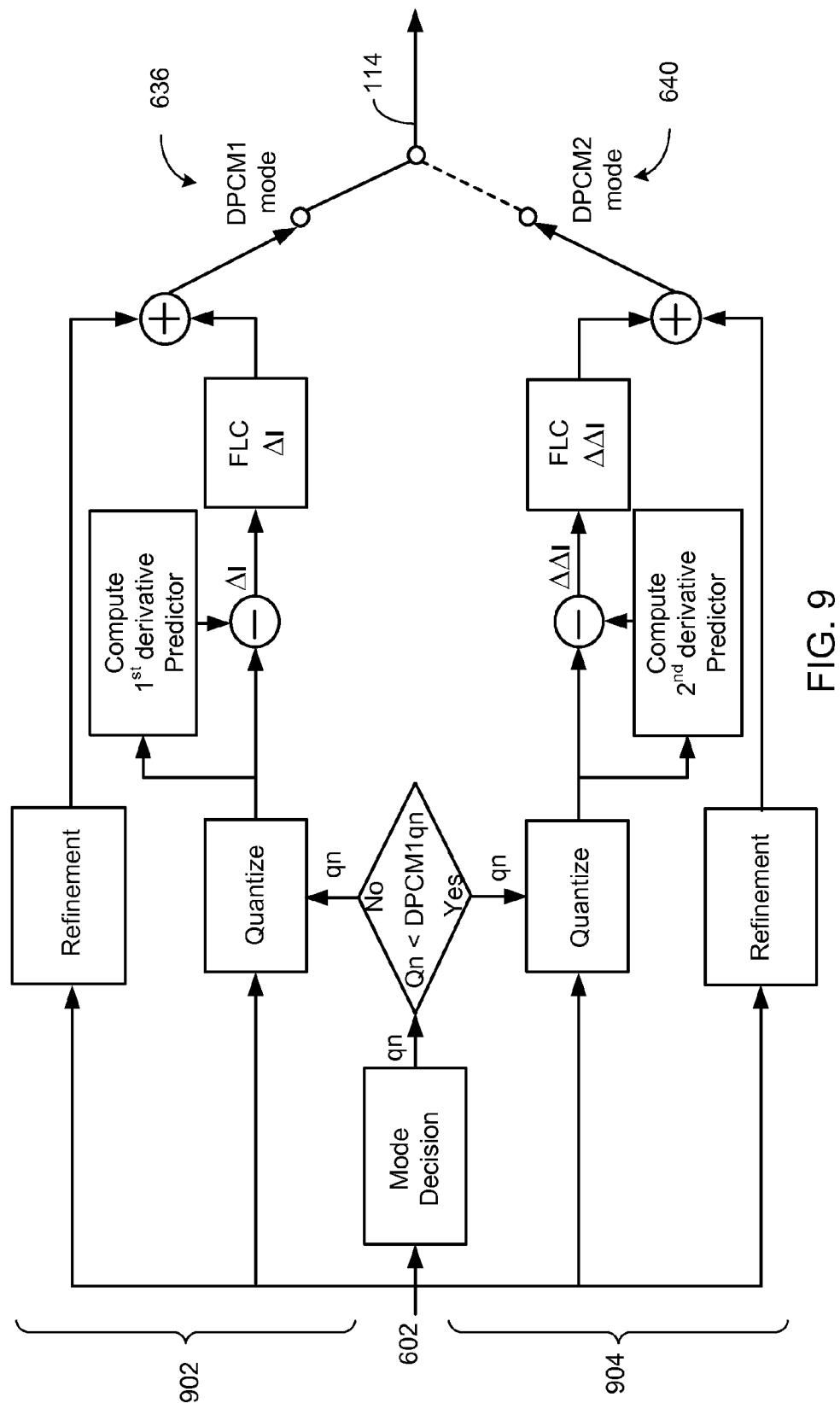
FIG. 9 is a second embodiment of the encoder.

Referring now to FIG. 9, therein is shown a second embodiment of the encoder 102 of FIG. 1. The encoder 102 can be configured with a first encoder unit 902 and a second encoder unit 904. The first encoder unit 902 can be configured to process the single differential pulse code modulation mode 636. The second encoder unit 904 can be configured to process the random access block 602 for the double differential pulse code modulation mode 640. The output of the first encoder unit 902 and the second encoder unit 904 can be combined and selected to form the image bitstream 114.

Figure 10:
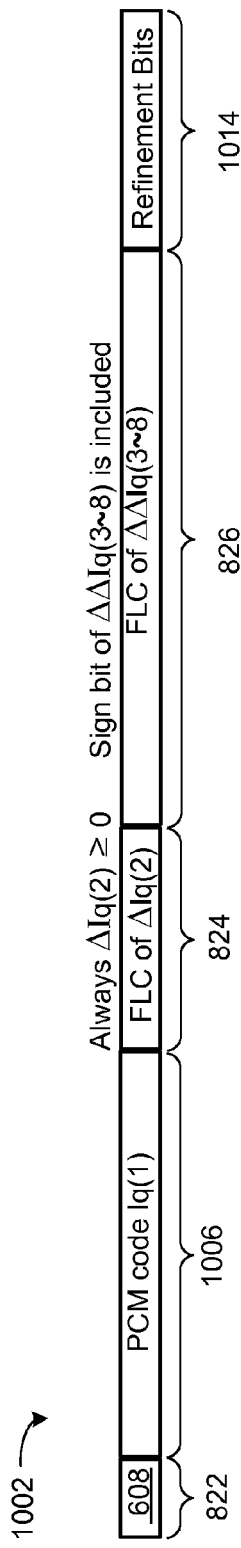
FIG. 10 is an example of the image bitstream for the straight image for a second coding mode.

Referring now to FIG. 10, therein is shown an example of the image bitstream 114 of FIG. 1 for the straight image 204 of FIG. 2 for a second coding mode 1002. The second coding mode 1002 can be a differential pulse code modulation where the quantization number is 0, 1, or 2. The image bitstream 114 can be a compressed representation of the straight image 204.

The image bitstream 114 can include the first derivative of the quantized block 726 of FIG. 7 ($\Delta$Iq) which is always non-negative. The image bitstream 114 can include the second derivative ($\Delta\Delta$Iq) of the quantized block 726 which can be negative.

The image bitstream 114 can include the quantization number field 822. The quantization number field 822 can store the binary value of the quantization number 608. The quantization number field 822 is two bits wide.

The image bitstream 114 can include a pulse code modulation field 1006. The pulse code modulation field 1006 can be an encoding of the first bit of the quantized block 726 of FIG. 7. The width of the pulse code modulation field 1006 is based on the quantization number 608 and can be calculated as 27 minus the quantization number 608.

The image bitstream 114 can include the single fixed length coding field 824. The single fixed length coding field 824 is the fixed length coding of the first derivative ($\Delta$Iq) of the second word of the quantized block 726. The width of the single fixed length coding field 824 can be calculated as 18 minus the quantization number 608. The single fixed length coding field 824 can include the sign bit.

The image bitstream 114 can include the double fixed length coding field 826. The double fixed length coding field 826 is the fixed length coding of the second derivative ($\Delta\Delta$Iq) of the third through eighth words of the quantized block 726. The width of the double fixed length coding field 826 in bits can be calculated by multiplying the fixed length coding length 620 of FIG. 6 by 6. The double fixed length coding field 826 can include the sign bit of the second derivative of the quantized block 726.

The image bitstream 114 can include a refinement bits field 1014. The refinement bits field 1014 is the location where the refinement bits 644 of FIG. 6 of the quantized block 726 are encoded. The width of the refinement bits field 1014 can be the left bits number of bits.

Figure 11:
FIG. 11 is an example of the image bitstream for the diagonal image for the first coding mode.

Referring now to FIG. 11, therein is shown an example of the image bitstream 114 of FIG. 1 for the diagonal image 302 of FIG. 3 for a first coding mode 1102. The first coding mode can be a differential pulse code modulation where the quantization number is 3. The image bitstream 114 can be a compressed representation of the diagonal image 302.

The image bitstream 114 can include the first derivative of the quantized block 726 of FIG. 7 ($\Delta$Iq) which is always non-negative. The image bitstream 114 can include the second derivative of the quantized block 726 ($\Delta\Delta$Iq) which can be negative.

The image bitstream 114 can include the quantization number field 822. The quantization number field 822 can store the binary value of the quantization number 608. The quantization number field 822 is three bits wide.

The image bitstream 114 can include the pulse code modulation field 1006 (pulse code modulation field). The pulse code modulation field 1006 can be an encoding of the first bit of the quantized block 726. The width of the pulse code modulation field 1006 is based on the quantization number 608 and can be calculated as 26 minus the quantization number 608. For example, the width of the pulse code modulation field 1006 can be 22 bits.

The image bitstream 114 can include the single fixed length coding field 824. The single fixed length coding field 824 is the fixed length coding of the first derivative ($\Delta Iq$) of the second through eighth words of the quantized block 726. The width of the single fixed length coding field 824 can be calculated as the result of 18 minus the quantization number 608 multiplied by 7. For example, the single fixed length coding field 824 can be 98 bits wide. The single fixed length coding field 824 can include the sign bit for the first derivative.

The image bitstream 114 can include the refinement bits field 1014. The refinement bits field 1014 is the location where the refinement bits 644 of FIG. 6 of the quantized block 726 are encoded. The width of the refinement bits field 1014 can be the left bits number of bits. For example, the refinement bits field 1014 can be 5 bits long.

Figure 12:
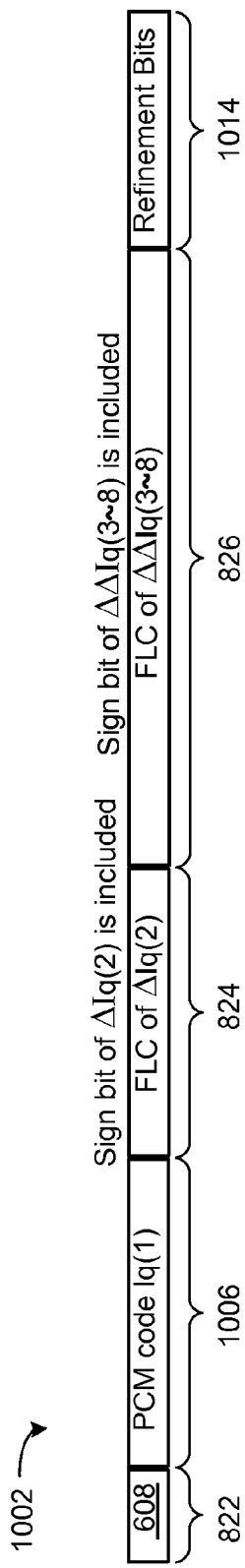
FIG. 12 is an example of the image bitstream for the diagonal image for a second coding mode.

Referring now to FIG. 12, therein is shown an example of the image bitstream 114 of FIG. 1 for the diagonal image 302 of FIG. 3 for the second coding mode 1002. The second coding mode can be a differential pulse code modulation where the quantization number is 0, 1, 2, or 3. The image bitstream 114 can be a compressed representation of the diagonal image 302.

The image bitstream 114 can include the first derivative of the quantized block 726 of FIG. 7 ($\Delta Iq$) which can be negative. The image bitstream 114 can include the second derivative ($\Delta\Delta Iq$) of the quantized block 726 which can be negative.

The image bitstream 114 can include the quantization number field 822. The quantization number field 822 can store the binary value of the quantization number 608. The quantization number field 822 is three bits wide.

The image bitstream 114 can include the pulse code modulation field 1006 (pulse code modulation field). The pulse code modulation field 1006 can be an encoding of the first bit of the quantized block 726. The width of the pulse code modulation field 1006 is based on the quantization number 608 and can be calculated as 26 minus the quantization number 608.

The image bitstream 114 can include the single fixed length coding field 824. The single fixed length coding field 824 is the fixed length coding of the first derivative ($\Delta Iq$) of the second word of the quantized block 726. The width of the single fixed length coding field 824 can be calculated as 18 minus the quantization number 608. The single fixed length coding field 824 can include the sign bit.

The image bitstream 114 can include the double fixed length coding field 826. The double fixed length coding field 826 is the fixed length coding of the second derivative ($\Delta\Delta Iq$) of the third through eighth words of the quantized block 726. The width of the double fixed length coding field 826 in bits can be calculated by multiplying the fixed length coding length 620 of FIG. 6 by 6. The double fixed length coding field 826 can include the sign bit of the second derivative of the quantized block 726.

The image bitstream 114 can include the refinement bits field 1014. The refinement bits field 1014 is the location where the refinement bits 644 of FIG. 6 of the quantized block 726 are encoded. The width of the refinement bits field 1014 can be the left bits number of bits.

Figure 13:
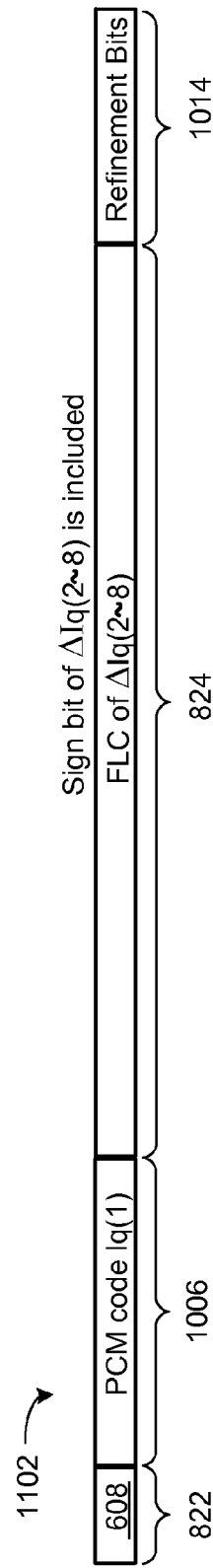
FIG. 13 is an example of the image bitstream for the diagonal image for the first coding mode.

Referring now to FIG. 13, therein is shown an example of the image bitstream 114 of FIG. 1 for the diagonal image 302 of FIG. 3 for the first coding mode 1102. The first coding mode 1102 can be a differential pulse code modulation where the quantization number is 4. The image bitstream 114 can be a compressed representation of the diagonal image 302.

The image bitstream 114 can include the first derivative of the quantized block 726 of FIG. 7 ($\Delta Iq$) which is always non-negative. The image bitstream 114 can include the second derivative of the quantized block 726 ($\Delta\Delta Iq$) which can be negative.

The image bitstream 114 can include the quantization number field 822. The quantization number field 822 can store the binary value of the quantization number 608. The quantization number field 822 is three bits wide. For example, the quantization number 608 can be binary code "100".

The image bitstream 114 can include the pulse code modulation field 1006 (pulse code modulation field). The pulse code modulation field 1006 can be an encoding of the first bit of the quantized block 726. The width of the pulse code modulation field 1006 is based on the quantization number 608 and can be calculated as 26 minus the quantization number 608. For example, the width of the pulse code modulation field 1006 can be 22 bits.

The image bitstream 114 can include the single fixed length coding field 824. The single fixed length coding field 824 is the fixed length coding of the first derivative ($\Delta Iq$) of the second through eighth words of the quantized block 726. The width of the single fixed length coding field 824 can be calculated as the result of 18 minus the quantization number 608 multiplied by 7. For example, the single fixed length coding field 824 can be 98 bits wide. The single fixed length coding field 824 can include the sign bit 742 of FIG. 7 for the first derivative.

The image bitstream 114 can include the refinement bits field 1014. The refinement bits field 1014 is the location where the refinement bits 644 of FIG. 6 of the quantized block 726 are encoded. The width of the refinement bits field 1014 can be the left bits number of bits. For example, the refinement bits field 1014 can be five bits wide.

Referring now to FIG. 14, therein is shown an example of a peak signal to noise ratio results for the straight image 204 of FIG. 2 in a 32-bit Integral domain. The results are provided for difference image scenarios and different encoding rates.

Referring now to FIG. 15, therein is shown an example of a peak signal to noise ratio results for the straight image 204 of FIG. 2 in an 8-bit pixel domain. The results are provided for difference image scenarios and different encoding rates.

Referring now to FIG. 16, therein is shown an example of a peak signal to noise ratio results for the diagonal image 302 of FIG. 3 in a 32-bit Integral domain. The results are provided for difference image scenarios and different encoding rates.

Referring now to FIG. 17, therein is shown an example of a peak signal to noise ratio results for the diagonal image 302 of FIG. 3 in an 8-bit pixel domain. The results are provided for difference image scenarios and different encoding rates.

Referring now to FIG. 18, therein is shown an example of the fixed length coding syntax 732. The fixed length coding syntax 732 can describe the arrangement of information in the image bitstream 114 of FIG. 1. Each of the elements of the random access block 602 of FIG. 6 can be represented in the image bitstream 114 as the absolute value of the residual value of the element and the sign bit 742 of the residual value. Each element, or sample, of the random access block 602 of FIG. 6 is arranged sequentially in the image bitstream 114.

Referring now to FIG. 19, therein is shown an example of a mode map 1902. The mode map 1902 can show the configuration of the image bitstream 114 of FIG. 1 based on the type of the integral image 112 of FIG. 1 and the coding method. The integral image 112, such as the straight image 204 of FIG. 2 or the diagonal image 302 of FIG. 3, can be encoded based on the quantization number 608 of FIG. 6 and the complexity of the data.

For example, the straight image 204 can be encoded using the double differential pulse code modulation mode 640 of FIG. 6 where the quantization number is binary 00, 01, or 10. If the quantization number is binary 11, then the single differential pulse code modulation mode 636 of FIG. 6 can be used.

In another example, the diagonal image 302 can be encoded using the double differential pulse code modulation mode 640 where the quantization number 608 has a binary value of 000, 001, 010, or 011. The diagonal image can be encoded using the single differential pulse code modulation mode 636 when the quantization number 608 has a binary value of "100."

Referring now to FIG. 20, therein is shown an example of the image bitstream 114 for the straight image 204 of FIG. 2. The layout of the image bitstream 114 is shown for different values of the quantization number 608.

Referring now to FIG. 21, therein is shown an example of reconstructed blocks 2102 for the straight image 204 of FIG. 2. The image bitstream 114 of FIG. 1 can form the reconstructed blocks as shown for each of the different values of the quantization number 608 of FIG. 6.

Figures 22, 23:
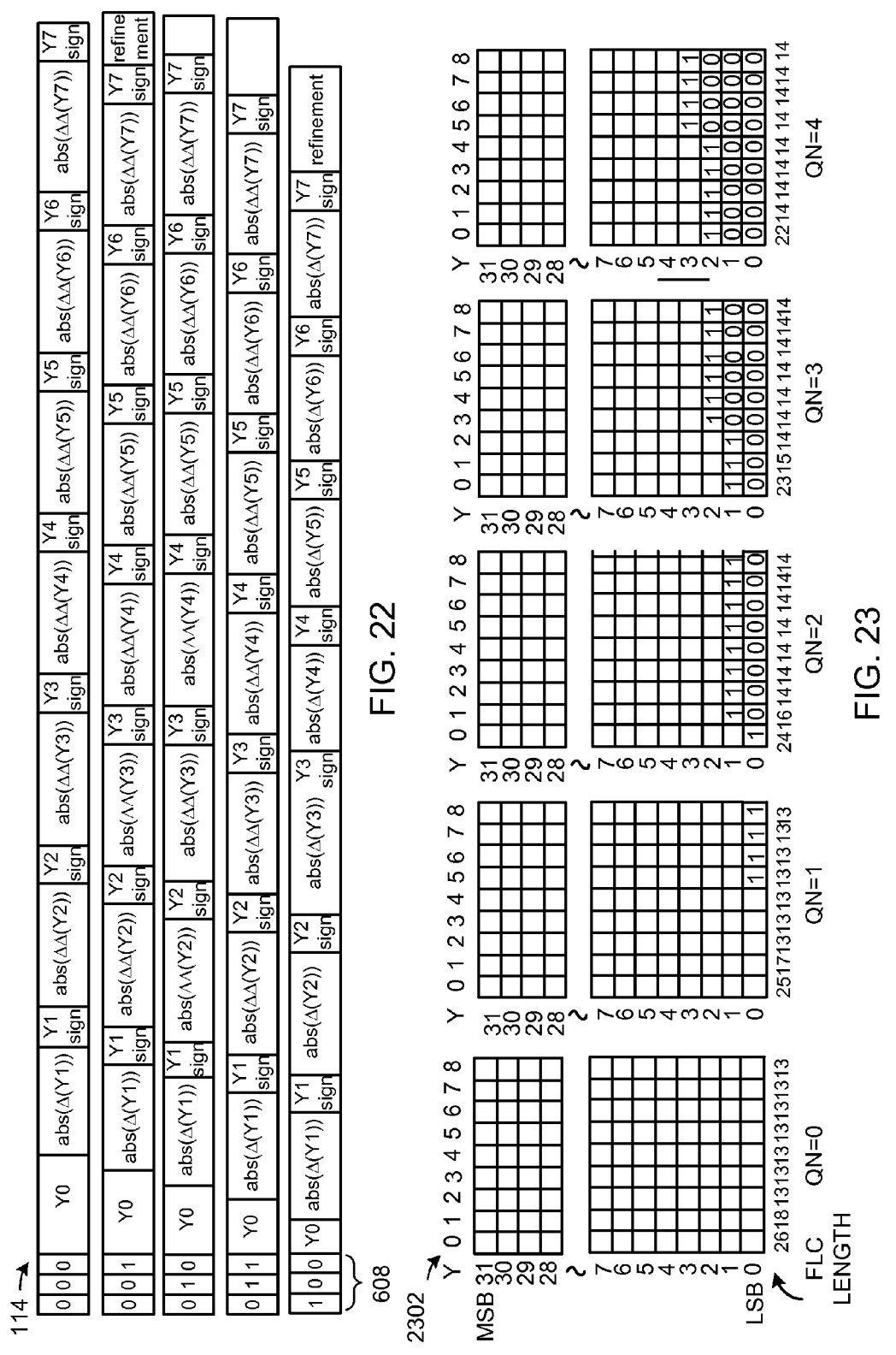

Referring now to FIG. 22, therein is shown an example of the image bitstream 114 for the diagonal image 302 of FIG. 3. The layout of the image bitstream 114 is shown for different values of the quantization number 608 of FIG. 6.

Referring now to FIG. 23, therein is shown an example of reconstructed blocks 2302 for the diagonal image 302 of FIG. 3. The image bitstream 114 of FIG. 1 can form the reconstructed blocks 2302 as shown for each of the different values of the quantization number 608.

Referring now to FIG. 24, therein is shown an example of the global control parameters 630 of FIG. 6 for the straight image 204 of FIG. 2. The global control parameters 630 are shown where qnList is the quantization number list 610 of FIG. 6, depth1 is the first depth 612 of FIG. 6, depth2 is the second depth 614 of FIG. 6, headerSize is the header size 616 of FIG. 6, FLC_length is the fixed length coding length 620 of FIG. 6, and RefinementBitsNum is the refinement bits number 622 of FIG. 6. The global control parameters 630 and exemplary values for the global control parameters 630 where the target bit rate is 16 bps are provided.

Referring now to FIG. 25, therein is shown an example of the global control parameters 630 of FIG. 6 for the diagonal image 302 of FIG. 3. The global control parameters 630 are shown where qnList is the quantization number list 610 of FIG. 6, depth1 is the first depth 612 of FIG. 6, depth2 is the second depth 614 of FIG. 6, headerSize is the header size 616 of FIG. 6, FLC_length is the fixed length coding length 620 of FIG. 6, and RefinementBitsNum is the refinement bits number 622 of FIG. 6. The global control parameters 630 and exemplary values for the global control parameters 630 where the target bit rate is 16 bps are provided.

Referring now to FIG. 26, therein is shown a pseudo code example for the mode module 702 of FIG. 7. The chosen mode 720 of FIG. 7 can be calculated for each of the random access block 602 of FIG. 6. The chosen mode 720 can be one of the elements of the quantization number list 610 of FIG. 6.

Referring now to FIG. 27, therein is shown a pseudo code example for the quantization module 704 of FIG. 7. The quantized block 726 of FIG. 7 can be calculated by right shifting the random access block 602 of FIG. 6 by the number of bit of the value of the chosen mode 720 of FIG. 7.

Referring now to FIG. 28, therein is shown a pseudo code example for the predictor module 706 of FIG. 7. The predictor block 728 of FIG. 7 can be calculated based on the chosen mode 720 of FIG. 7.

For example, if the chosen mode 720 indicates the use of the single differential pulse code modulation mode 636 of FIG. 6, then the predictor block 728 can be calculated the first derivative of elements of the quantized block 726 of FIG. 7. If the chosen mode 720 indicate the use of the double differential pulse code modulation mode 640 of FIG. 6, then the predictor block 728 can be calculated from the second derivative of the elements of the quantized block 726.

Referring now to FIG. 29, therein is shown a pseudo code example for a compute residual function 2902. The compute residual function 2902 can be performed in the fixed length coding module 708 of FIG. 7. The compute residual function 2902 can calculate the residual block 730 of FIG. 7 by subtracting the predictor block 728 of FIG. 7 from the quantized block 726 of FIG. 7.

Referring now to FIG. 30, therein is shown a pseudo code example for the fixed length coding module 708 of FIG. 7. The fixed length coding module 708 can determine the fixed length coding size 740 of FIG. 7 and the sign bit 742 of FIG. 7 for the quantized block 726 of FIG. 7 based on the chosen mode 720 of FIG. 7. The residual block 730 of FIG. 7 can be inserted into the image bitstream 114 of FIG. 1 based on the fixed length coding size 740 and the sign bit 742.

Referring now to FIG. 31, therein is shown a pseudo code example for the refinement module 710 of FIG. 7. The refinement module 710 can extract the refinement bits 644 of FIG. 6 from the random access block 602 of FIG. 6 based on the chosen mode 720 of FIG. 7 and insert the refinement bits 644 into the refinement bits field 1014 of FIG. 10 of the image bitstream 114 of FIG. 1.

Referring now to FIG. 32, therein is shown a pseudo code example for the reconstruct quantized block module 804 of FIG. 8 of the decoder 104 of FIG. 1. The reconstruct quantized block module 804 can calculate the fixed length coding size 740 of FIG. 7 and calculate the quantized block 726 of FIG. 7.

The reconstruct quantized block module 804 can calculate the fixed length coding size 740 based on the first depth 612 of FIG. 6, the second depth 614 of FIG. 6, the chosen mode 720 of FIG. 7, and the fixed length coding length 620 of FIG. 6. The reconstruct quantized block module 804 can calculate the sign bit 742 of FIG. 7 based on the chosen mode 720 of FIG. 7 and the quantization number list 610 of FIG. 6 as indicated by the pseudo code.

The reconstruct quantized block module 804 can calculate the quantized block 726 using the decode fixed length coding function 3302 of FIG. 33 to determine the first and second elements of the fixed length coding residual 736 from the image bitstream 114 of FIG. 1 as shown in the pseudo code.

The reconstruct quantized block module 804 can calculate the quantized block 726 using the decode fixed length coding function 3302 to determine the third through eighth elements of the fixed length coding residual 736 from the image bitstream 114. A decoder predictor 3202 can be extracted from the quantized block 726 based on the chosen mode 720. The decoder predictor 3202 can be calculated as the element in the quantized block 726 if the chosen mode 720 indicates the last element in the quantization number list 610. If the chosen mode 720 does not indicate the last element in the quantization number list 610, then the decoder predictor 3202 can be the first derivative of the element of the quantized block 726.

After the decoder predictor 3202 has been calculated, the quantized block 726 can be determined by calling the decode fixed length coding function 3302 and passing the image bitstream 114, the bit position, the fixed length coding size 740 element, the sign bit 742, and the decoder predictor 3202. The decode fixed length coding function 3302 is described in further detail in the decode fixed length coding function pseudo code section below.

Referring now to FIG. 33, therein is shown a pseudo code example for the decode fixed length coding function 3302 of the decoder 104 of FIG. 1. The decode fixed length coding function 3302 can calculate each of the elements of the fixed length coding residual 736 of FIG. 7 as shown in the pseudo code.

The decode fixed length coding function 3302 can be recursively called to extract the absolute value of the elements of the residual block 730 grouped with the sign flag 624 of FIG. 6 for each element of the residual block 730 as indicated by the fixed length coding syntax 732 of FIG. 7.

Referring now to FIG. 34, therein is shown a pseudo code example for the bit-shift module 806 of FIG. 8 of the decoder 104 of FIG. 1. The bit-shift module 806 can left shift the quantized block 726 of FIG. 7 by the number of bits of the value of the chosen mode 720 of FIG. 7.

Referring now to FIG. 35, therein is shown a pseudo code example for the reconstruct refinement bits module 808 of FIG. 8 of the decoder 104 of FIG. 1. The reconstruct refinement bits module 808 can extract the refinement bits field 1014 of FIG. 10 from the image bitstream 114 of FIG. 1 as shown in the pseudo code. The width of the refinement bits field 1014 is the refinement bits number 622 of FIG. 6.

Referring now to FIG. 36, therein is shown a pseudo code example for the middle reconstruction module 810 of FIG. 8 of the decoder 104 of FIG. 1. The middle reconstruction module 810 can combine the quantized block 726 of FIG. 7 from the bit-shift module 806 of FIG. 8 and the refinement bits 644 of FIG. 6 from the reconstruct refinement bits module 808 of FIG. 8 to form the random access block 602 of FIG. 6 in the decoder 104 as shown in the pseudo code.

The decoder 104 can continue to process the image bitstream 114 of FIG. 1 to calculate the random access block 602 until the integral image 112 of FIG. 1 is complete. Once the integral image 112 has been decoded from the image bitstream 114, the integral image 112 can used for other image processing functions.

Figure 37:
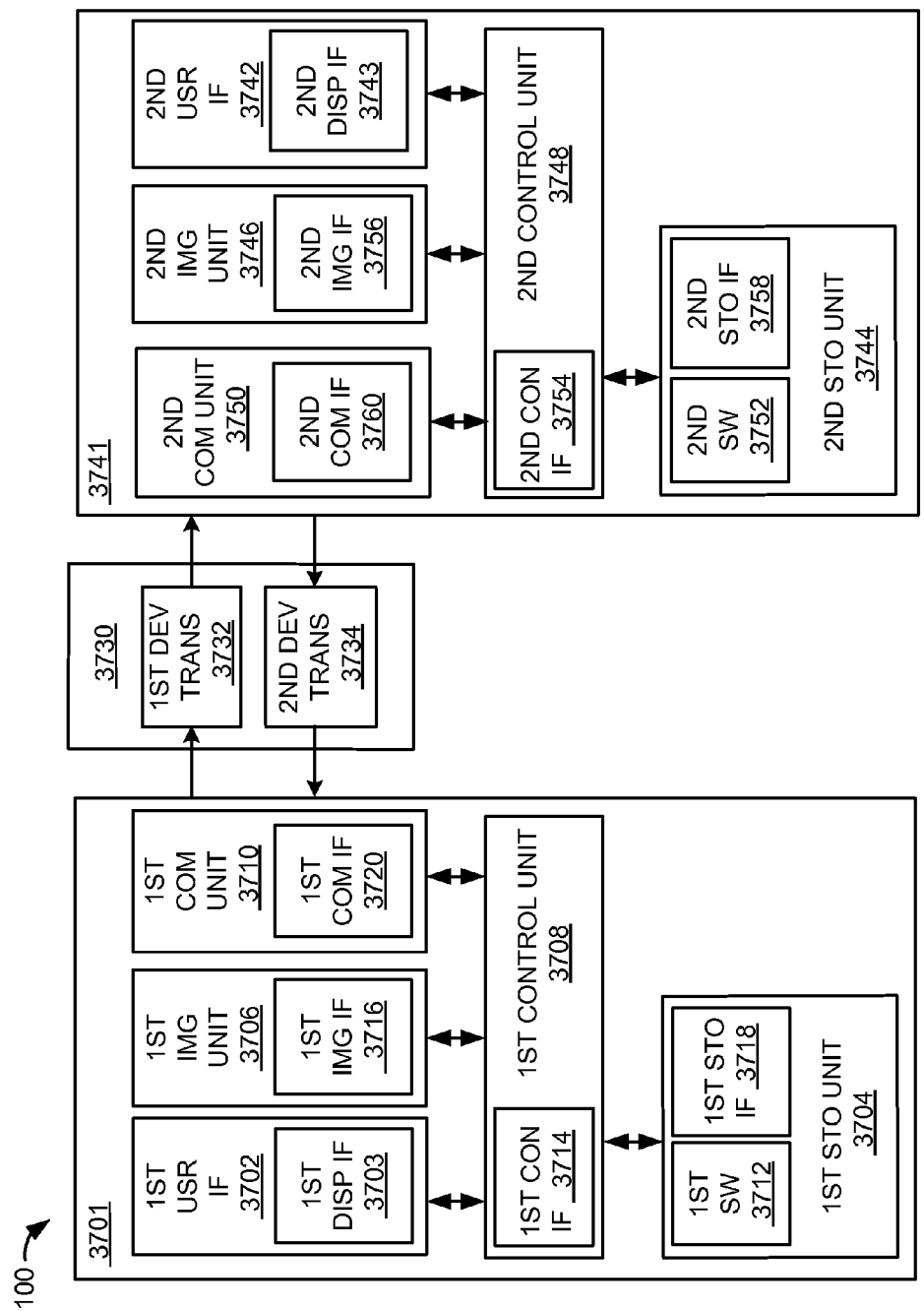
FIG. 37 is an example of a functional block diagram of the image processing system.

Referring now to FIG. 37, therein is shown an example of a functional block diagram of the image processing system 100. The image processing system 100 can include a first device 3701, a second device 3741 and a communication path 3730.

The image processing system 100 can be implemented using the first device 3701, the second device 3741, and the communication path 3730. For example, the first device 3701 can implement the encoder 102 of FIG. 1, the second device 3741 can implement the decoder 104 of FIG. 1, and the communication path 3730 can implement the communication link 106 of FIG. 1. However, it is understood that the image processing system 100 can be implemented in a variety of ways and the functionality of the imaging device 108 of FIG. 1, the display device 118 of FIG. 1, and the communication path 3730 can be partitioned differently over the first device 3701, the second device 3741, and the communication path 3730.

The first device 3701 can communicate with the second device 3741 over the communication path 3730. The first device 3701 can send information in a first device transmission 3732 over the communication path 3730 to the second device 3741. The second device 3741 can send information in a second device transmission 3734 over the communication path 3730 to the first device 3701.

For illustrative purposes, the image processing system 100 is shown with the first device 3701 as a client device, although it is understood that the image processing system 100 can have the first device 3701 as a different type of device. For example, the first device can be a server.

Also for illustrative purposes, the image processing system 100 is shown with the second device 3741 as a server, although it is understood that the image processing system 100 can have the second device 3741 as a different type of device. For example, the second device 3741 can be a client device.

For brevity of description in this embodiment of the present invention, the first device 3701 will be described as a client device, such as a video camera, smart phone, or a combination thereof. The present invention is not limited to this selection for the type of devices. The selection is an example of the present invention.

The first device 3701 can include a first control unit 3708. The first control unit 3708 can include a first control interface 3714. The first control unit 3708 can execute a first software 3712 to provide the intelligence of the image processing system 100.

The first control unit 3708 can be implemented in a number of different manners. For example, the first control unit 3708 can be a processor, an embedded processor, a microprocessor, a graphical processing unit, a hardware control logic, a hardware finite state machine (FSM), a digital signal processor (DSP), or a combination thereof.

The first control interface 3714 can be used for communication between the first control unit 3708 and other functional units in the first device 3701. The first control interface 3714 can also be used for communication that is external to the first device 3701.

The first control interface 3714 can receive information from the other functional units or from external sources, or can transmit information to the other functional units or to external destinations. The external sources and the external destinations refer to sources and destinations external to the first device 3701.

The first control interface 3714 can be implemented in different ways and can include different implementations depending on which functional units or external units are being interfaced with the first control interface 3714. For example, the first control interface 3714 can be implemented with electrical circuitry, microelectromechanical systems (MEMS), optical circuitry, wireless circuitry, wireline circuitry, or a combination thereof.

The first device 3701 can include a first storage unit 3704. The first storage unit 3704 can store the first software 3712. The first storage unit 3704 can also store the relevant information, such as images, syntax information, videos, profiles, display preferences, sensor data, or any combination thereof.

The first storage unit 3704 can be a volatile memory, a nonvolatile memory, an internal memory, an external memory, or a combination thereof. For example, the first storage unit 3704 can be a nonvolatile storage such as non-volatile random access memory (NVRAM), Flash memory, disk storage, or a volatile storage such as static random access memory (SRAM).

The first storage unit 3704 can include a first storage interface 3718. The first storage interface 3718 can be used for communication between the first storage unit 3704 and other functional units in the first device 3701. The first storage interface 3718 can also be used for communication that is external to the first device 3701.

The first device 3701 can include a first imaging unit 3706. The first imaging unit 3706 can capture the source image 110 of FIG. 1 for forming the integral image 112 of FIG. 1. The first imaging unit 3706 can include a digital camera, a video camera, an optical sensor, or any combination thereof.

The first imaging unit 3706 can include a first imaging interface 3716. The first imaging interface 3716 can be used for communication between the first imaging unit 3706 and other functional units in the first device 3701.

The first imaging interface 3716 can receive information from the other functional units or from external sources, or can transmit information to the other functional units or to external destinations. The external sources and the external destinations refer to sources and destinations external to the first device 3701.

The first imaging interface 3716 can include different implementations depending on which functional units or external units are being interfaced with the first imaging unit 3706. The first imaging interface 3716 can be implemented with technologies and techniques similar to the implementation of the first control interface 3714.

The first storage interface 3718 can receive information from the other functional units or from external sources, or can transmit information to the other functional units or to external destinations. The external sources and the external destinations refer to sources and destinations external to the first device 3701.

The first storage interface 3718 can include different implementations depending on which functional units or external units are being interfaced with the first storage unit 3704. The first storage interface 3718 can be implemented with technologies and techniques similar to the implementation of the first control interface 3714.

The first device 3701 can include a first communication unit 3710. The first communication unit 3710 can be for enabling external communication to and from the first device 3701. For example, the first communication unit 3710 can permit the first device 3701 to communicate with the second device 3741, an attachment, such as a peripheral device or a computer desktop, and the communication path 3730.

The first communication unit 3710 can also function as a communication hub allowing the first device 3701 to function as part of the communication path 3730 and not limited to be an end point or terminal unit to the communication path 3730. The first communication unit 3710 can include active and passive components, such as microelectronics or an antenna, for interaction with the communication path 3730.

The first communication unit 3710 can include a first communication interface 3720. The first communication interface 3720 can be used for communication between the first communication unit 3710 and other functional units in the first device 3701. The first communication interface 3720 can receive information from the other functional units or can transmit information to the other functional units.

The first communication interface 3720 can include different implementations depending on which functional units are being interfaced with the first communication unit 3710. The first communication interface 3720 can be implemented with technologies and techniques similar to the implementation of the first control interface 3714.

The first device 3701 can include a first user interface 3702. The first user interface 3702 allows a user (not shown) to interface and interact with the first device 3701. The first user interface 3702 can include a first user input (not shown). The first user input can include touch screen, gestures, motion detection, buttons, slicers, knobs, virtual buttons, voice recognition controls, or any combination thereof.

The first user interface 3702 can include the first display interface 3703. The first display interface 3703 can allow the user to interact with the first user interface 3702. The first display interface 3703 can include a display, a video screen, a speaker, or any combination thereof.

The first control unit 3708 can operate with the first user interface 3702 to display image information generated by the image processing system 100 on the first display interface 3703. The first control unit 3708 can also execute the first software 3712 for the other functions of the image processing system 100, including receiving image information from the first storage unit 3704 for display on the first display interface 3703. The first control unit 3708 can further execute the first software 3712 for interaction with the communication path 3730 via the first communication unit 3710.

For illustrative purposes, the first device 3701 can be partitioned having the first user interface 3702, the first storage unit 3704, the first control unit 3708, and the first communication unit 3710, although it is understood that the first device 3701 can have a different partition. For example, the first software 3712 can be partitioned differently such that some or all of its function can be in the first control unit 3708 and the first communication unit 3710. Also, the first device 3701 can include other functional units not shown in FIG. 17 for clarity.

The image processing system 100 can include the second device 3741. The second device 3741 can be optimized for implementing the present invention in a multiple device embodiment with the first device 3701. The second device 3741 can provide the additional or higher performance processing power compared to the first device 3701.

The second device 3741 can include a second control unit 3748. The second control unit 3748 can include a second control interface 3754. The second control unit 3748 can execute a second software 3752 to provide the intelligence of the image processing system 100.

The second control unit 3748 can be implemented in a number of different manners. For example, the second control unit 3748 can be a processor, an embedded processor, a microprocessor, a graphical processing unit, a hardware control logic, a hardware finite state machine (FSM), a digital signal processor (DSP), or a combination thereof.

The second control interface 3754 can be used for communication between the second control unit 3748 and other functional units in the second device 3741. The second control interface 3754 can also be used for communication that is external to the second device 3741.

The second control interface 3754 can receive information from the other functional units or from external sources, or can transmit information to the other functional units or to external destinations. The external sources and the external destinations refer to sources and destinations external to the second device 3741.

The second control interface 3754 can be implemented in different ways and can include different implementations depending on which functional units or external units are being interfaced with the second control interface 3754. For example, the second control interface 3754 can be implemented with electrical circuitry, microelectromechanical systems (MEMS), optical circuitry, wireless circuitry, wireline circuitry, or a combination thereof.

The second device 3741 can include a second storage unit 3744. The second storage unit 3744 can store the second software 3752. The second storage unit 3744 can also store the relevant information, such as images, syntax information, video, profiles, display preferences, sensor data, or any combination thereof.

The second storage unit 3744 can be a volatile memory, a nonvolatile memory, an internal memory, an external memory, or a combination thereof. For example, the second storage unit 3744 can be a nonvolatile storage such as nonvolatile random access memory (NVRAM), Flash memory, disk storage, or a volatile storage such as static random access memory (SRAM).

The second storage unit 3744 can include a second storage interface 3758. The second storage interface 3758 can be used for communication between the second storage unit 3744 and other functional units in the second device 3741. The second storage interface 3758 can also be used for communication that is external to the second device 3741.

The second storage interface 3758 can receive information from the other functional units or from external sources, or can transmit information to the other functional units or to external destinations. The external sources and the external destinations refer to sources and destinations external to the second device 3741.

The second storage interface 3758 can include different implementations depending on which functional units or external units are being interfaced with the second storage unit 3744. The second storage interface 3758 can be implemented with technologies and techniques similar to the implementation of the second control interface 3754.

The second device 3741 can include a second imaging unit 3746. The second imaging unit 3746 can capture the source image 110 from the real world. The first imaging unit 3706 can include a digital camera, a video camera, an optical sensor, or any combination thereof.

The second imaging unit 3746 can include a second imaging interface 3756. The second imaging interface 3756 can be used for communication between the second imaging unit 3746 and other functional units in the second device 3741.

The second imaging interface 3756 can receive information from the other functional units or from external sources, or can transmit information to the other functional units or to external destinations. The external sources and the external destinations refer to sources and destinations external to the second device 3741.

The second imaging interface 3756 can include different implementations depending on which functional units or external units are being interfaced with the second imaging unit 3746. The second imaging interface 3756 can be implemented with technologies and techniques similar to the implementation of the first control interface 3714.

The second device 3741 can include a second communication unit 3750. The second communication unit 3750 can enable external communication to and from the second device 3741. For example, the second communication unit 3750 can permit the second device 3741 to communicate with the first device 3701, an attachment, such as a peripheral device or a computer desktop, and the communication path 3730.

The second communication unit 3750 can also function as a communication hub allowing the second device 3741 to function as part of the communication path 3730 and not limited to be an end point or terminal unit to the communication path 3730. The second communication unit 3750 can include active and passive components, such as microelectronics or an antenna, for interaction with the communication path 3730.

The second communication unit 3750 can include a second communication interface 3760. The second communication interface 3760 can be used for communication between the second communication unit 3750 and other functional units in the second device 3741. The second communication interface 3760 can receive information from the other functional units or can transmit information to the other functional units.

The second communication interface 3760 can include different implementations depending on which functional units are being interfaced with the second communication unit 3750. The second communication interface 3760 can be implemented with technologies and techniques similar to the implementation of the second control interface 3754.

The second device 3741 can include a second user interface 3742. The second user interface 3742 allows a user (not shown) to interface and interact with the second device 3741. The second user interface 3742 can include a second user input (not shown). The second user input can include touch screen, gestures, motion detection, buttons, slicers, knobs, virtual buttons, voice recognition controls, or any combination thereof.

The second user interface 3742 can include a second display interface 3743. The second display interface 3743 can allow the user to interact with the second user interface 3742. The second display interface 3743 can include a display, a video screen, a speaker, or any combination thereof.

The second control unit 3748 can operate with the second user interface 3742 to display information generated by the image processing system 100 on the second display interface 3743. The second control unit 3748 can also execute the second software 3752 for the other functions of the image processing system 100, including receiving display information from the second storage unit 3744 for display on the second display interface 3743. The second control unit 3748 can further execute the second software 3752 for interaction with the communication path 3730 via the second communication unit 3750.

For illustrative purposes, the second device 3741 can be partitioned having the second user interface 3742, the second storage unit 3744, the second control unit 3748, and the second communication unit 3750, although it is understood that the second device 3741 can have a different partition. For example, the second software 3752 can be partitioned differently such that some or all of its function can be in the second control unit 3748 and the second communication unit 3750. Also, the second device 3741 can include other functional units not shown in FIG. 17 for clarity.

The first communication unit 3710 can couple with the communication path 3730 to send information to the second device 3741 in the first device transmission 3732. The second device 3741 can receive information in the second communication unit 3750 from the first device transmission 3732 of the communication path 3730.

The second communication unit 3750 can couple with the communication path 3730 to send image information to the first device 3701 in the second device transmission 3734. The first device 3701 can receive image information in the first communication unit 3710 from the second device transmission 3734 of the communication path 3730. The image processing system 100 can be executed by the first control unit 3708, the second control unit 3748, or a combination thereof.

The functional units in the first device 3701 can work individually and independently of the other functional units. For illustrative purposes, the image processing system 100 is described by operation of the first device 3701. It is understood that the first device 3701 can operate any of the modules and functions of the image processing system 100. For example, the first device 3701 can be described to operate the first control unit 3708.

The functional units in the second device 3741 can work individually and independently of the other functional units. For illustrative purposes, the image processing system 100 can be described by operation of the second device 3741. It is understood that the second device 3741 can operate any of the modules and functions of the image processing system 100. For example, the second device 3741 is described to operate the second control unit 3748.

For illustrative purposes, the image processing system 100 is described by operation of the first device 3701 and the second device 3741. It is understood that the first device 3701 and the second device 3741 can operate any of the modules and functions of the image processing system 100. For example, the first device 3701 is described to operate the first control unit 3708, although it is understood that the second device 3741 can also operate the first control unit 3708.

The physical transformation from the images of physical objects of the source image 110 of FIG. 1 to capturing the images on the pixel imaging elements of the imaging device 108 of FIG. 1 results in physical changes to the pixel imaging elements of the imaging device 108 in the physical world, such as the change of electrical state the pixel imaging elements, is based on the operation of the image processing system 100. As the changes in the physical world occurs, such as the motion of the imaging sensor used to capture the source image 110, the movement itself creates additional information, such as the updates to the source image 110, that are converted back into changes in the pixel elements of the integral image 112 for continued operation of the image processing system 100.

The first software 3712 of the first device 3701 can implement portions of the image processing system 100. For example, the first software 3712 can include the mode module 702 of FIG. 7, the quantization module 704 of FIG. 7, the predictor module 706 of FIG. 7, the fixed length coding module 708 of FIG. 7, the refinement module 710 of FIG. 7, and the code quantization number module 712 of FIG. 7.

The first control unit 3708 can execute the first software 3712 for the mode module 702 to determine the chosen mode 720 of FIG. 7. The first control unit 3708 can execute the first software 3712 for the quantization module 704 form the quantized block 726 of FIG. 7. The first control unit 3708 can execute the first software 3712 for the predictor module 706 to calculate the predictor block 728 of FIG. 7. The first control unit 3708 can execute the first software 3712 for the fixed length coding module 708 to form the fixed length coding block 734 of FIG. 7. The first control unit 3708 can execute the first software 3712 for the refinement module 710 to encode the refinement bits 644 of FIG. 6. The first control unit 3708 can execute the first software 3712 for the code quantization number module 712 to encode the quantization number 608 of FIG. 6 in the image bitstream 114 of FIG. 1.

The second software 3752 of the second device 3741 can implement portions of the image processing system 100. For example, the second software 3752 can include the extract quantization number module 802 of FIG. 8, the reconstruct quantized block module 804 of FIG. 8, the bit-shift module 806 of FIG. 8, the reconstruct refinement bits module 808 of FIG. 8, and the middle reconstruction module 810 of FIG. 8.

The second control unit 3748 can execute the second software 3752 for the extract quantization number module 802. The second control unit 3748 can execute the second software 3752 for the reconstruct quantized block module 804. The second control unit 3748 can execute the second software 3752 for the bit-shift module 806. The second control unit 3748 can execute the second software 3752 for the reconstruct refinement bits module 808. The second control unit 3748 can execute the second software 3752 for the middle reconstruction module 810.

The image processing system 100 can be partitioned between the first software 3712 and the second software 3752. For example, the first software 3712 can include the mode module 702 and the quantization module 704. The second software 3752 can include the bit-shift module 806 and the reconstruct refinement bits module 808. The first control unit 3708 can execute the modules partitioned to the first software 3712. The second control unit 3748 can execute modules partitioned to the second software 3752.

The image processing system 100 describes the module functions or order as an example. Each of the modules can operate individually and independently of the other modules. The modules can be partitioned differently. For example the predictor module 706, the fixed length coding module 708, and the refinement module 710 can be combined.

Furthermore, data generated in one module can be used by another module without being directly coupled to each other. For example, the quantization module 704 and the fixed length coding module 708 can receive the chosen mode 720 from the mode module 702.

The modules can be implemented in a variety of ways. The quantization module 704, the predictor module 706, and the fixed length coding module 708 can be implemented in hardware accelerators (not shown) within the first control unit 3708 or the second control unit 3748, or can be implemented in hardware accelerators (not shown) in the first device 3701 or the second device 3741 outside of the first control unit 3708 or the second control unit 3748.

Figure 38:
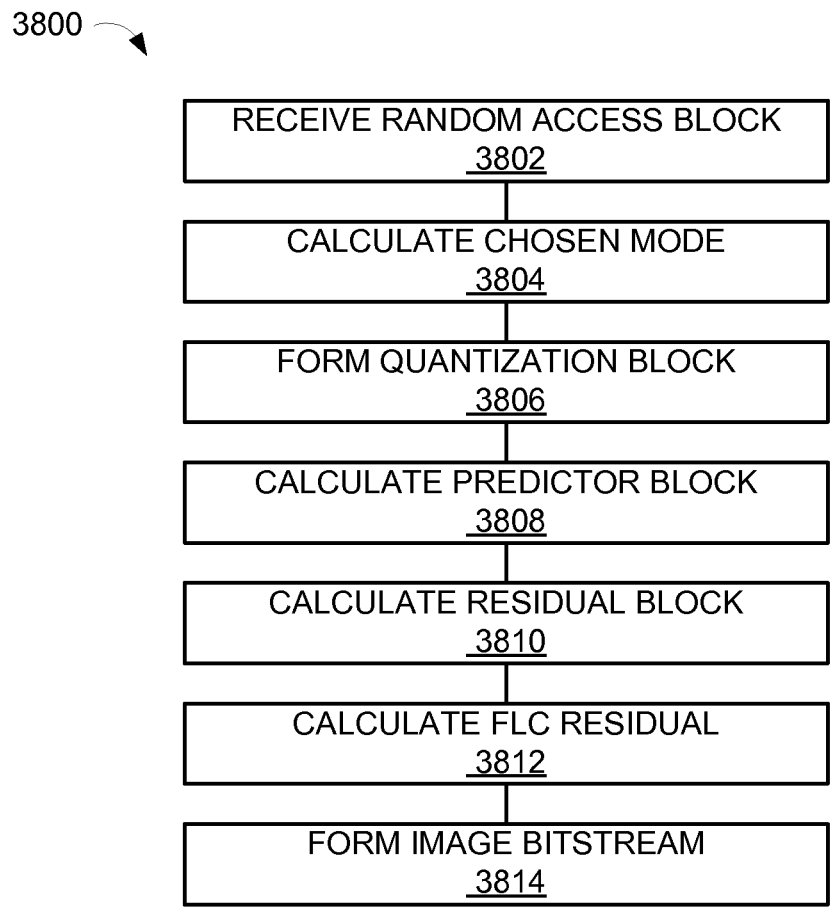
FIG. 38 is a flow chart of a method of operation of the imaging processing system in a further embodiment of the present invention.

Referring now to FIG. 38, therein is shown a flow chart of a method 3800 of operation of the imaging processing system in a further embodiment of the present invention. The method 3800 includes: receiving a random access block of an integral image, the integral image formed by summing a portion of a source image received from an imaging device in a block 3802; calculating a chosen mode and a quantization number from the random access block in a block 3804; forming a quantized block by shifting the random access block based on the chosen mode in a block 3806; calculating a predictor block based on the quantized block 3808; calculating a residual block by subtracting the predictor block from the quantized block in a block 3810; calculating a fixed length coding residual based on the chosen mode and the residual block in a block 3812 and forming an image bitstream having the quantization number and the fixed length coding residual in a block 3814.

It has been discovered that the present invention thus has numerous aspects. The present invention valuably supports and services the historical trend of reducing costs, simplifying systems, and increasing performance. These and other valuable aspects of the present invention consequently further the state of the technology to at least the next level.

Thus, it has been discovered that the image processing system of the present invention furnishes important and heretofore unknown and unavailable solutions, capabilities, and functional aspects for processing image content. The resulting processes and configurations are straightforward, cost-effective, uncomplicated, highly versatile and effective, can be surprisingly and unobviously implemented by adapting known technologies, and are thus readily suited for efficiently and economically manufacturing image coding devices fully compatible with conventional manufacturing processes and technologies. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an image processing system comprising:
    receiving a random access block of an integral image, the integral image formed by summing a portion of a source image received from an imaging device;
    calculating a chosen mode and a quantization number from the random access block;
    forming a quantized block by shifting the random access block based on the chosen mode;
    calculating a predictor block based on the quantized block;
    calculating a residual block by subtracting the predictor block from the quantized block;
    calculating a fixed length coding residual based on the chosen mode and the residual block; and
    forming an image bitstream having the quantization number and the fixed length coding residual.

2. The method as claimed in claim 1 wherein calculating the predictor block includes calculating the predictor block based on the chosen mode, the predictor block having a second order derivative of the quantized block.

3. The method as claimed in claim 1 wherein calculating the predictor block includes calculating the predictor block based on the chosen mode, the predictor block having a first order derivative of the quantized block.

4. The method as claimed in claim 1 wherein forming the image bitstream includes forming the image bitstream having a first order derivative of the quantized block and a second order derivative of the quantized block.

5. The method as claimed in claim 1 wherein calculating the chosen mode includes selecting the chosen mode from a quantization number list.

6. A method of operation of an image processing system comprising:
    receiving a random access block of an integral image, the integral image formed by summing a portion of a source image received from an imaging device;
    calculating a chosen mode and a quantization number from the random access block;
    forming a quantized block by shifting the random access block based on the chosen mode;
    calculating a predictor block based on the quantized block;
    calculating a residual block by subtracting the predictor block from the quantized block;
    calculating a fixed length coding residual based on the chosen mode and the residual block;
    calculating refinement bits based on the random access block and a refinement bits number; and
    forming an image bitstream having the quantization number, the fixed length coding residual, and the refinement bits.

7. The method as claimed in claim 6 wherein calculating the predictor block includes calculating the predictor block based on the chosen mode, the predictor block having a second order derivative of the quantized block.

8. The method as claimed in claim 6 wherein calculating the predictor block includes calculating the predictor block based on the chosen mode, the predictor block having a first order derivative of the quantized block.

9. The method as claimed in claim 6 wherein forming the image bitstream includes forming the image bitstream having a first order derivative of the quantized block and a second order derivative of the quantized block.

10. The method as claimed in claim 6 wherein calculating the chosen mode includes selecting the chosen mode from a quantization number list.

11. An image processing system comprising:
    an imaging device for receiving a source image;
    a mode module, coupled to the imaging device, for receiving a random access block of an integral image formed by summing a portion of the source image, and for calculating a chosen mode and a quantization number from the random access block;
    a quantization module, coupled to the mode module, for forming a quantized block by shifting the random access block based on the chosen mode;
    a predictor module, coupled to the quantization module, for calculating a predictor block based on the quantized block; and
    a fixed length coding module, coupled to the predictor module, for calculating a residual block by subtracting the predictor block from the quantized block, for calculating a fixed length coding residual based on the chosen mode and the residual block, and for forming an image bitstream having the quantization number and the fixed length coding residual.

12. The system as claimed in claim 11, wherein the predictor module is for calculating the predictor block based on the chosen mode with the predictor block having a second order derivative of the quantized block.

13. The system as claimed in claim 11, wherein the predictor module is for calculating the predictor block based on the chosen mode with the predictor block having a first order derivative of the quantized block.

14. The system as claimed in claim 11, wherein the fixed length coding module is for forming the image bitstream having a first order derivative of the quantized block and a second order derivative of the quantized block.

15. The system as claimed in claim 11, wherein the mode module is for selecting the chosen mode from a quantization number list.

16. The system as claimed in claim 11, further comprising a refinement module, coupled to the fixed length coding module, for calculating refinement bits based on the random access block and a refinement bits number, and for forming the image bitstream having the refinement bits.

17. The system as claimed in claim 16, wherein the predictor module is for calculating the predictor block based on the chosen mode with the predictor block having a second order derivative of the quantized block.

18. The system as claimed in claim 16, wherein the predictor module is for calculating the predictor block based on the chosen mode with the predictor block having a first order derivative of the quantized block.

19. The system as claimed in claim 16, wherein the fixed length coding module is for forming the image bitstream having a first order derivative of the quantized block and a second order derivative of the quantized block.

20. The system as claimed in claim 16, wherein the mode module is for selecting the chosen mode from a quantization number list.

* * * * *